(12) United States Patent
Rollinger et al.

(10) Patent No.: US 11,104,208 B2
(45) Date of Patent: Aug. 31, 2021

(54) METHOD FOR OPERATING A VEHICLE CLIMATE CONTROL SYSTEM

(71) Applicant: Ford Global Technologies, LLC, Dearborn, MI (US)

(72) Inventors: John Eric Rollinger, Troy, MI (US); Jeffrey Allen Doering, Canton, MI (US); Hugh Hamilton, Troy, MI (US); Brent Jacobsen, Ann Arbor, MI (US); Steve Pryor Perry, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 15/633,256

(22) Filed: Jun. 26, 2017

(65) Prior Publication Data

US 2017/0291472 A1 Oct. 12, 2017

Related U.S. Application Data

(62) Division of application No. 13/243,607, filed on Sep. 23, 2011, now Pat. No. 9,688,116.

(51) Int. Cl.
*B60H 1/32* (2006.01)
*F25B 49/02* (2006.01)
*B60H 1/00* (2006.01)

(52) U.S. Cl.
CPC ....... *B60H 1/3216* (2013.01); *B60H 1/00807* (2013.01); *F25B 49/022* (2013.01); *B60H 2001/3261* (2013.01); *B60H 2001/3275* (2013.01); *F25B 2500/19* (2013.01); *F25B 2600/023* (2013.01); *F25B 2600/0251* (2013.01); *F25B 2700/2117* (2013.01)

(58) Field of Classification Search
CPC .............. B60H 1/3216; B60H 1/00807; B60H 2001/3275; B60H 2001/3261; F25B 49/022; F25B 49/025; F25B 2500/19; F25B 2700/2117; F25B 2600/023
See application file for complete search history.

(56) References Cited

U.S. PATENT DOCUMENTS

| | | | |
|---|---|---|---|
| 4,806,836 | A | 2/1989 | Nebb |
| 6,230,507 | B1 | 5/2001 | Ban et al. |
| 8,875,529 | B2 | 11/2014 | Rollinger et al. |
| 9,272,602 | B2 | 3/2016 | Ollinger et al. |
| 9,587,868 | B2 | 3/2017 | Ollinger et al. |

(Continued)

FOREIGN PATENT DOCUMENTS

KR 20070081350 A * 8/2007

OTHER PUBLICATIONS

Marshall, R., "Adaptive and predictive control of underfloor heating systems," Proceedings of the 1st World Renewable Energy Congress, Sep. 23, 1990, Reading, United Kingdom, 7 pages.

(Continued)

*Primary Examiner* — Edward F Landrum
*Assistant Examiner* — Alexis K Cox
(74) *Attorney, Agent, or Firm* — Geoffrey Brumbaugh

(57) ABSTRACT

A method for controlling torque of an air conditioner compressor is disclosed. In one example, the air conditioner compressor is a variable displacement compressor. The method may provide smooth transitions between different air conditioner compressor torques.

8 Claims, 11 Drawing Sheets

(56) References Cited

U.S. PATENT DOCUMENTS

| | | | |
|---|---|---|---|
| 2001/0007194 A1 | 7/2001 | Kimura et al. | |
| 2001/0013225 A1* | 8/2001 | Ota | F04B 27/1804 62/228.5 |
| 2002/0078700 A1 | 6/2002 | Kelm et al. | |
| 2002/0157409 A1 | 10/2002 | Pham et al. | |
| 2004/0003614 A1 | 1/2004 | Parsch et al. | |
| 2004/0016241 A1 | 1/2004 | Street et al. | |
| 2005/0066669 A1* | 3/2005 | Sugesawa | B60H 1/3208 62/133 |
| 2006/0086117 A1* | 4/2006 | Lee | B60H 1/3211 62/228.1 |
| 2007/0163276 A1* | 7/2007 | Braun | F25B 49/005 62/149 |
| 2007/0234739 A1* | 10/2007 | Delaloye | F01D 19/00 60/786 |
| 2007/0255488 A1* | 11/2007 | Okubo | B60W 10/30 701/110 |
| 2007/0261420 A1 | 11/2007 | Baruschke et al. | |
| 2008/0104982 A1 | 5/2008 | Sunderland | |
| 2008/0125954 A1 | 5/2008 | Kuroda et al. | |
| 2008/0307811 A1 | 12/2008 | Bryan et al. | |
| 2009/0287319 A1 | 11/2009 | Attarwala | |
| 2009/0293839 A1 | 12/2009 | Yu et al. | |
| 2009/0299529 A1 | 12/2009 | Hill et al. | |
| 2009/0299533 A1 | 12/2009 | Hill et al. | |
| 2010/0186430 A1 | 7/2010 | Johnston et al. | |
| 2011/0219787 A1 | 9/2011 | Keen et al. | |
| 2011/0219797 A1* | 9/2011 | Taguchi | F25B 49/022 62/129 |
| 2012/0138016 A1 | 6/2012 | Martin et al. | |
| 2012/0259530 A1* | 10/2012 | Wakou | B60H 1/00778 701/102 |
| 2013/0074526 A1 | 3/2013 | Rollinger et al. | |
| 2013/0074529 A1 | 3/2013 | Rollinger et al. | |
| 2014/0210387 A1 | 7/2014 | Zhao et al. | |

OTHER PUBLICATIONS

State Intellectual Property Office of the People's Republic of China, Office Action Issued in Application No. 201210302842.3, dated Sep. 6, 2015, 8 pages. (Submitted with Partial Translation).

State Intellectual Property Office of the People's Republic of China, Office Action Issued in Application No. 201210352595.8, dated Sep. 6, 2015, 9 pages. (Submitted with Partial Translation).

* cited by examiner

METHOD FOR OPERATING A VEHICLE CLIMATE CONTROL SYSTEM

CROSS REFERENCE TO RELATED APPLICATION

The present application is a divisional of U.S. patent application Ser. No. 13/243,607, entitled "METHOD FOR OPERATING A VEHICLE CLIMATE CONTROL SYSTEM," filed on Sep. 23, 2011. The entire contents of the above-referenced application are hereby incorporated by reference in its entirety for all purposes.

FIELD

The present description relates to a method for operating a vehicle climate control system. The method may be particularly useful for managing starting and stopping of a climate control system.

BACKGROUND AND SUMMARY

Vehicle air conditioning systems can provide a driver with a comfortable environment during warm and/or humid ambient driving conditions. Air from the vehicle cabin is passed over an evaporator that cools the air and condenses water vapor from the air, thereby conditioning the cabin air to improve driver comfort. Air conditioning systems may be sized with a high cooling capacity so that the driver may be comfortable during particularly warm days. However, it may not be desirable to operate the air conditioner and air conditioner compressor all the time once a desired vehicle cabin temperature is reached.

Vehicle cabin temperature can be controlled for high capacity air conditioning systems via mechanically coupling and decoupling the air conditioner to the source supplying energy to the compressor. For example, the compressor clutch can be activated when cabin temperature increases above a desired cabin temperature by a predetermined amount. Conversely, the compressor clutch can be deactivated when cabin temperature decreases below the desired cabin temperature by a predetermined amount. However, mechanically coupling and decoupling the air conditioner compressor to the energy source can be noticeable and objectionable to the driver of the vehicle.

The inventors herein have recognized the above-mentioned disadvantages and have developed method for controlling an air conditioner compressor of a vehicle, comprising: reducing a refrigerant pressurization capacity of the air conditioning compressor before engaging and disengaging the air conditioner compressor to an energy conversion device that supplies rotational energy to the air conditioner compressor.

By adjusting an air conditioner compressor displacement command before engaging and disengaging the air conditioner from an energy supply, it may be possible to reduce torque disturbances of the vehicle driveline. For example, when a length of stroke of an air conditioner compressor piston is reduced, an amount of torque to turn the compressor may be reduced. Consequently, changes in output torque of the energy source may be less noticeable to the vehicle driver when the air conditioner compressor is coupled to an energy source while less torque is necessary to turn the air conditioner compressor. Similarly, changes to the output torque of the energy source may be less noticeable to the driver when the air conditioner compressor is uncoupled from the energy source while less torque is necessary to turn the air conditioner compressor.

The present description may provide several advantages. Specifically, the approach may improve transitions between loading and unloading an air conditioner compressor to a vehicle powertrain. In addition, the approach may improve fuel control when the air conditioner compressor is coupled to an engine since changes in engine load may be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
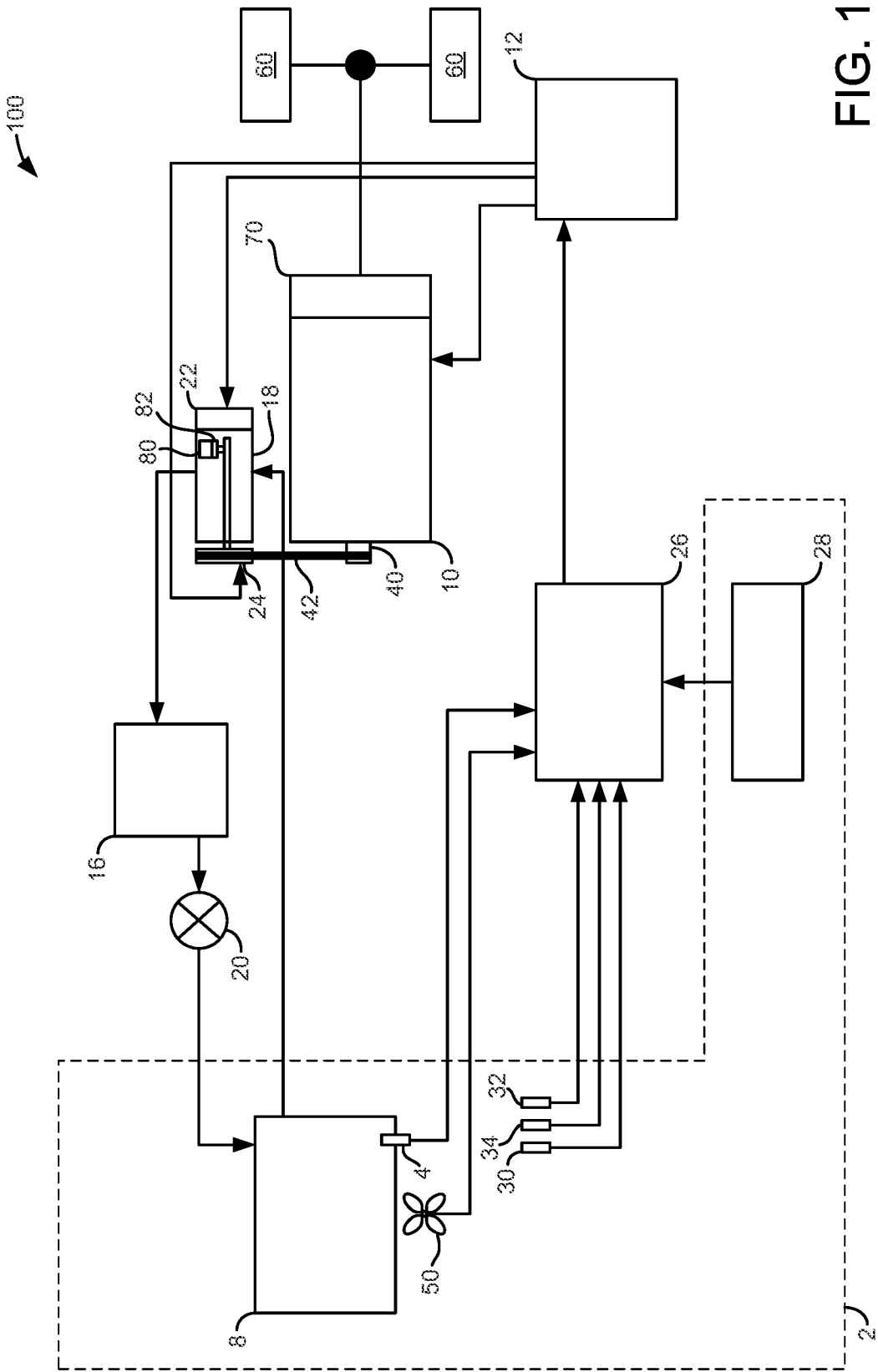
FIG. 1 is a schematic diagram of a vehicle air conditioning system.
Figure 2:
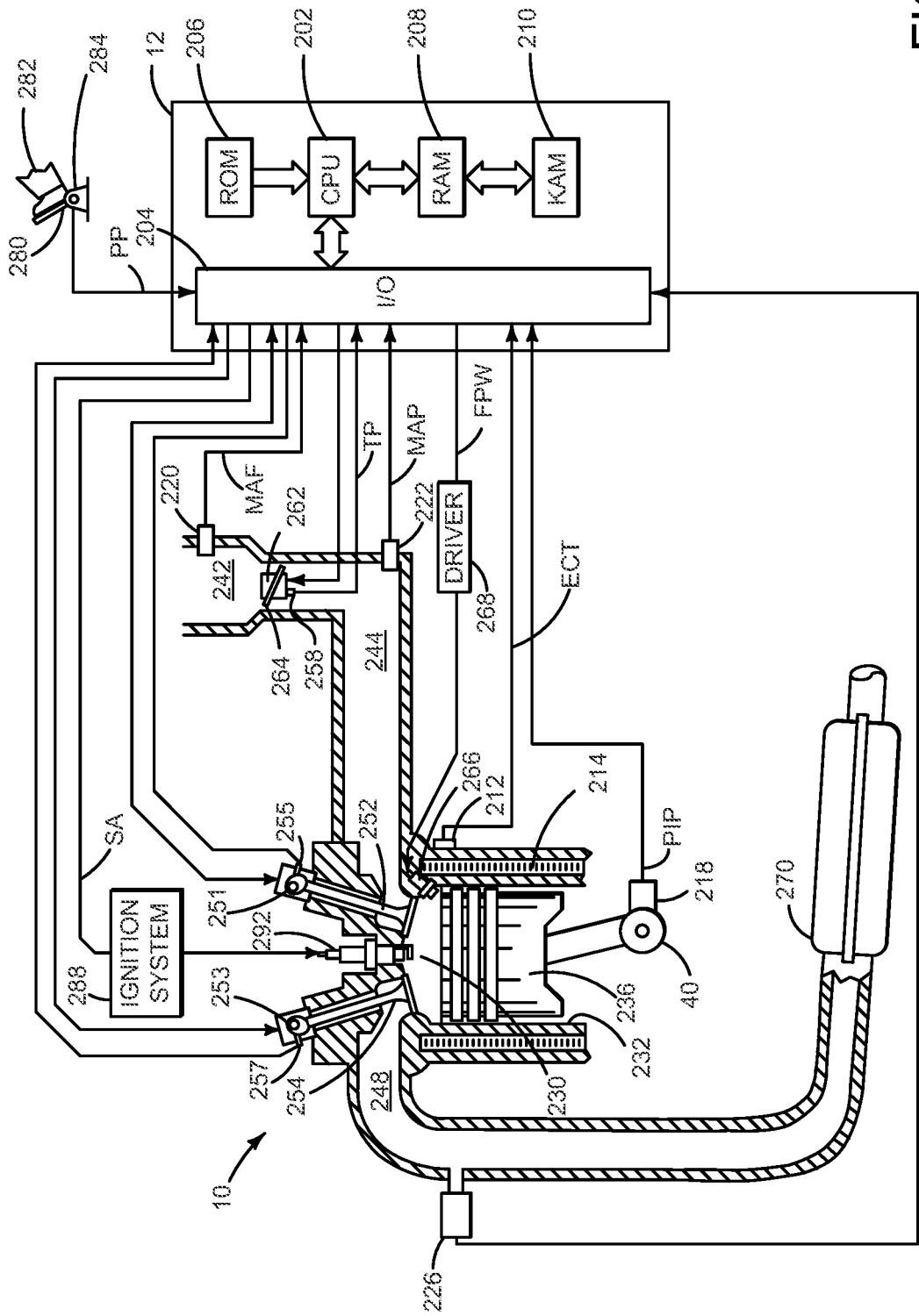
FIG. 2 is a schematic diagram of the energy conversion device of FIG. 1 where the energy conversion device is an engine.
Figure 3:
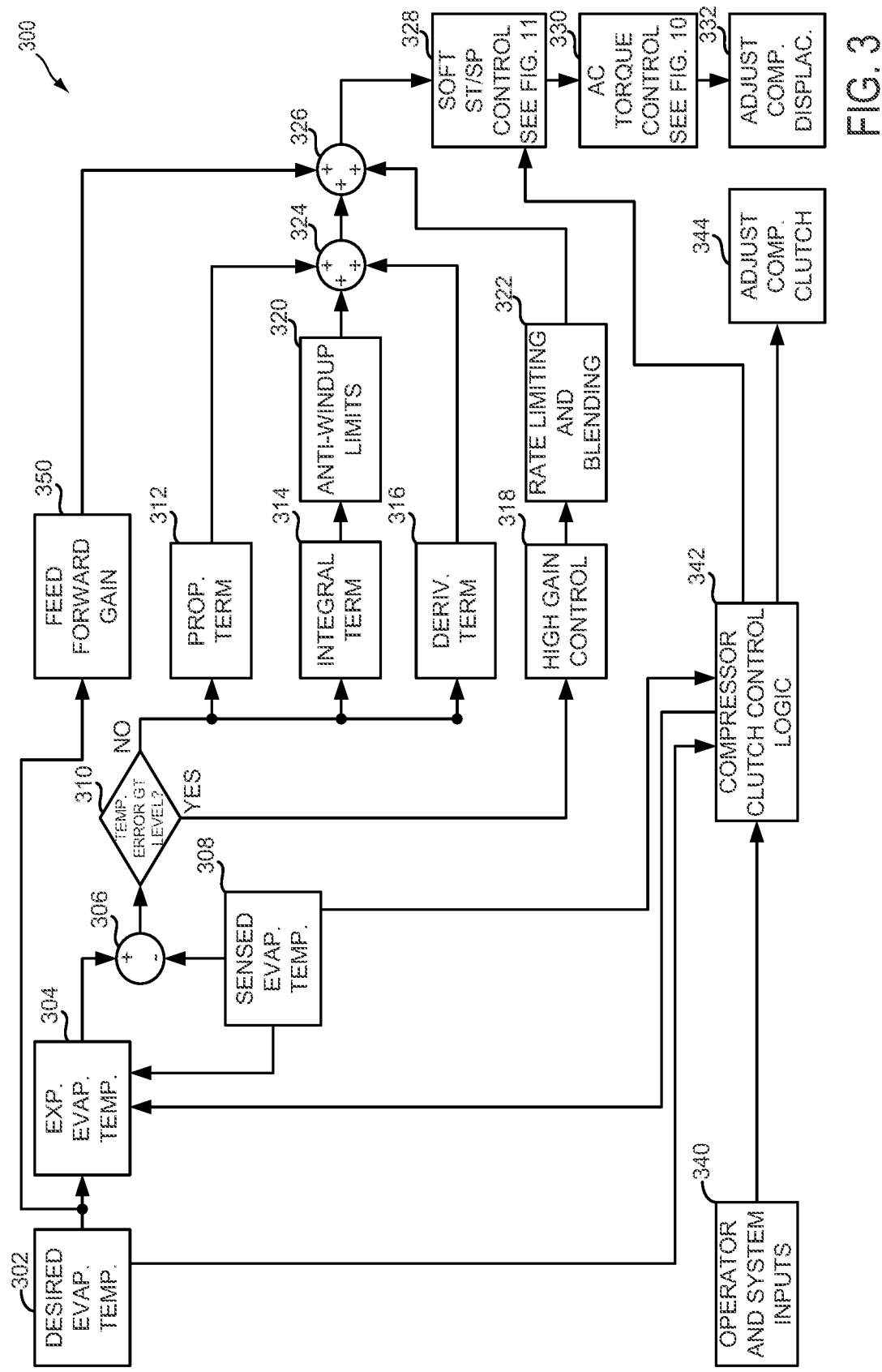
FIG. 3 is a block diagram of a control algorithm or method for operating an air conditioning system of a vehicle.
Figure 4:
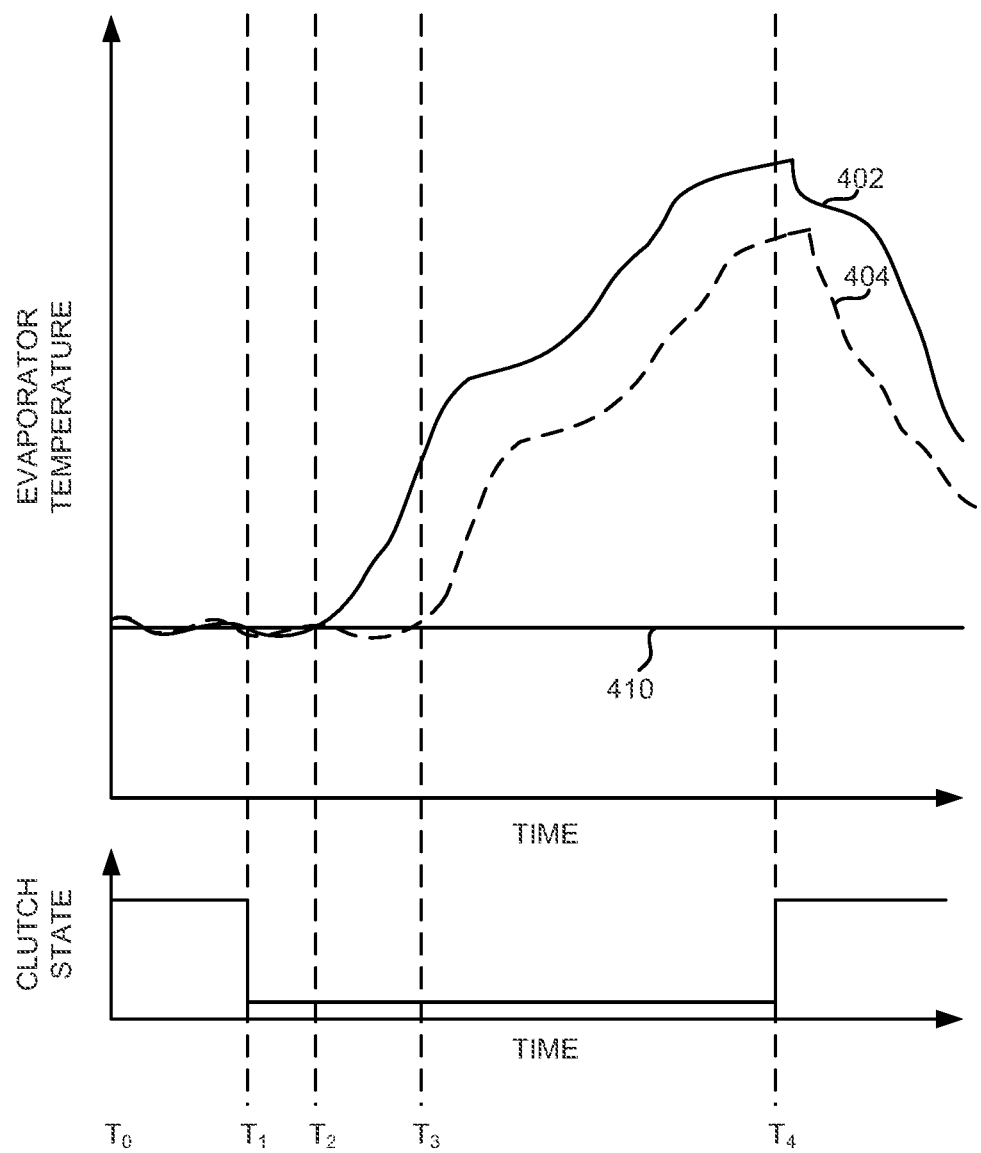
FIG. 4 is an example plot of simulated signals of interest during air conditioning system operation.
Figure 5:
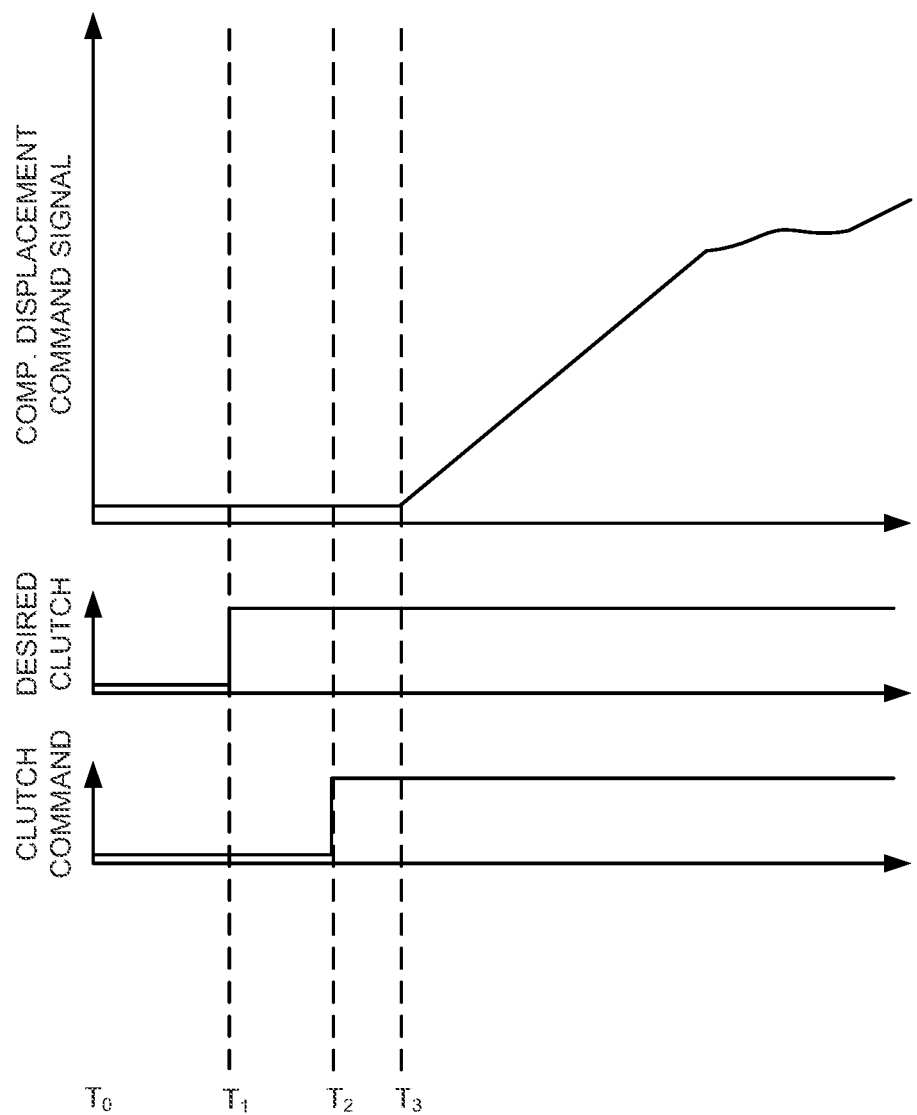
FIG. 5 is an example plot of simulated signals of interest during air conditioner activation.
Figure 6:
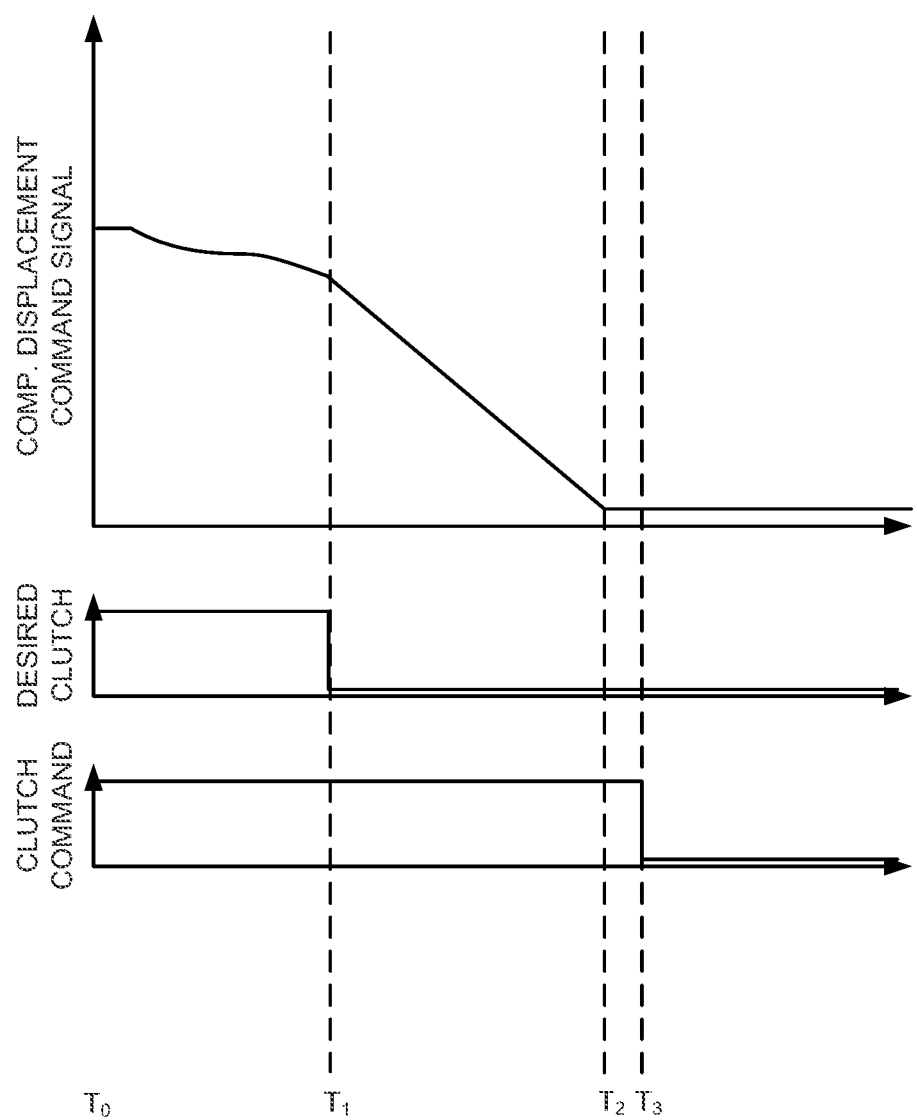
FIG. 6 is an example plot of simulated signals of interest during air conditioner deactivation.
Figure 7:
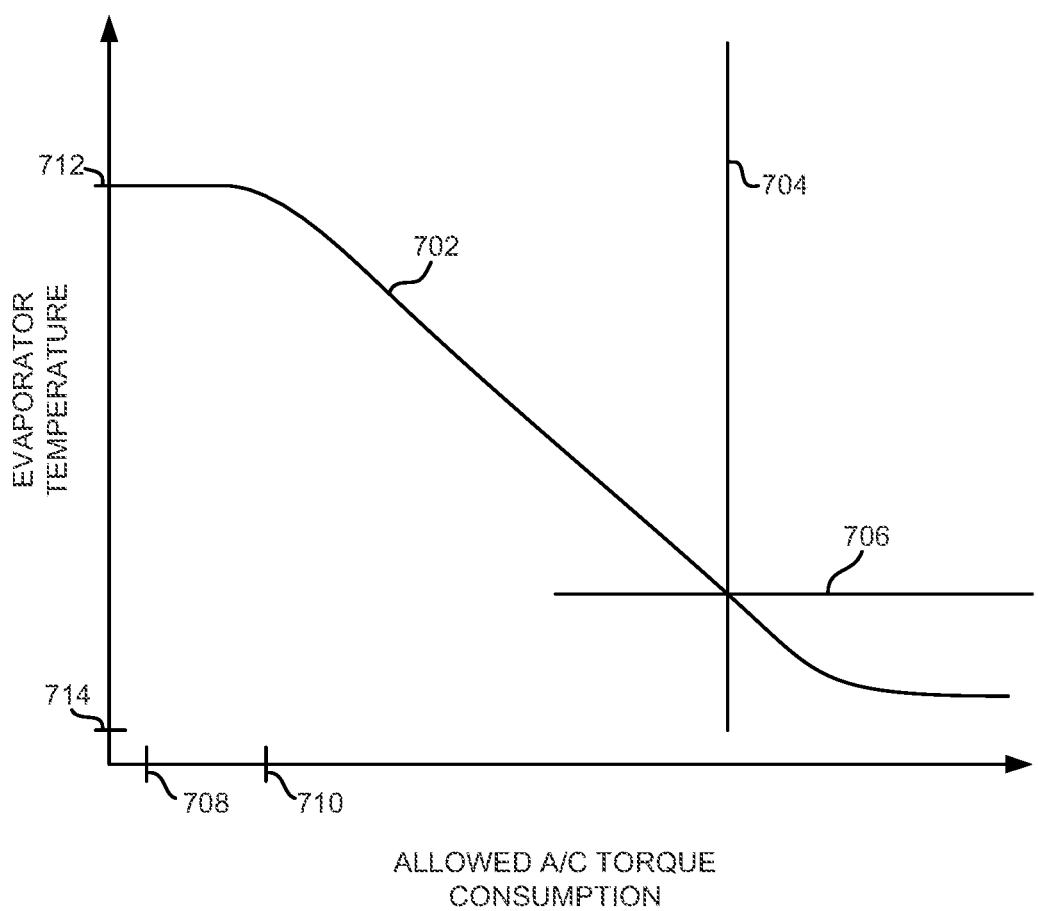
FIG. 7 is an example simulated plot illustrating air conditioning system control temperature versus air conditioning system torque.
Figure 8C:
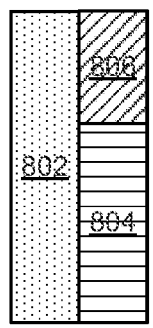
Figure 9:
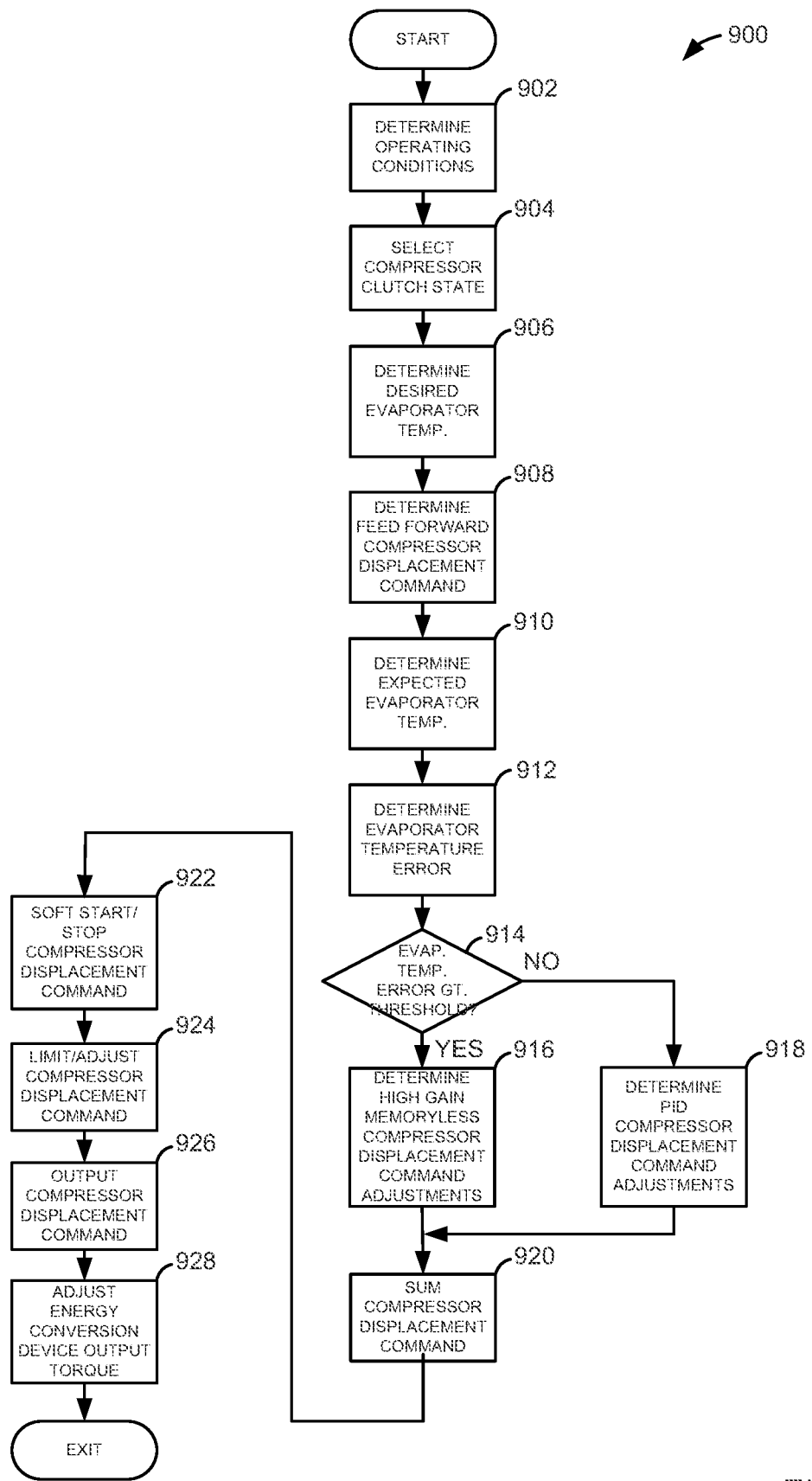
FIG. 9 shows a method for controlling a vehicle air conditioning system.
Figure 10:
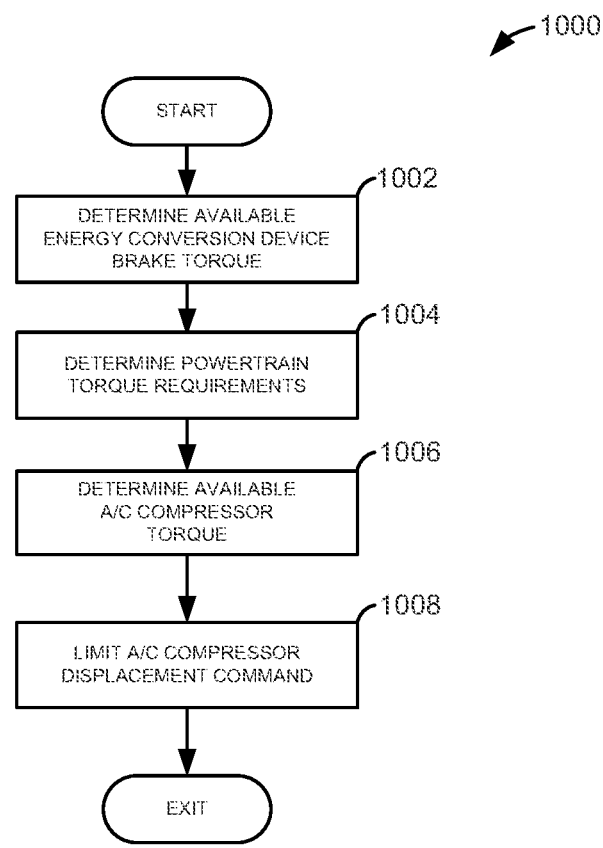
FIG. 10 shows a method for adjusting an air conditioner displacement demand.
Figure 11:
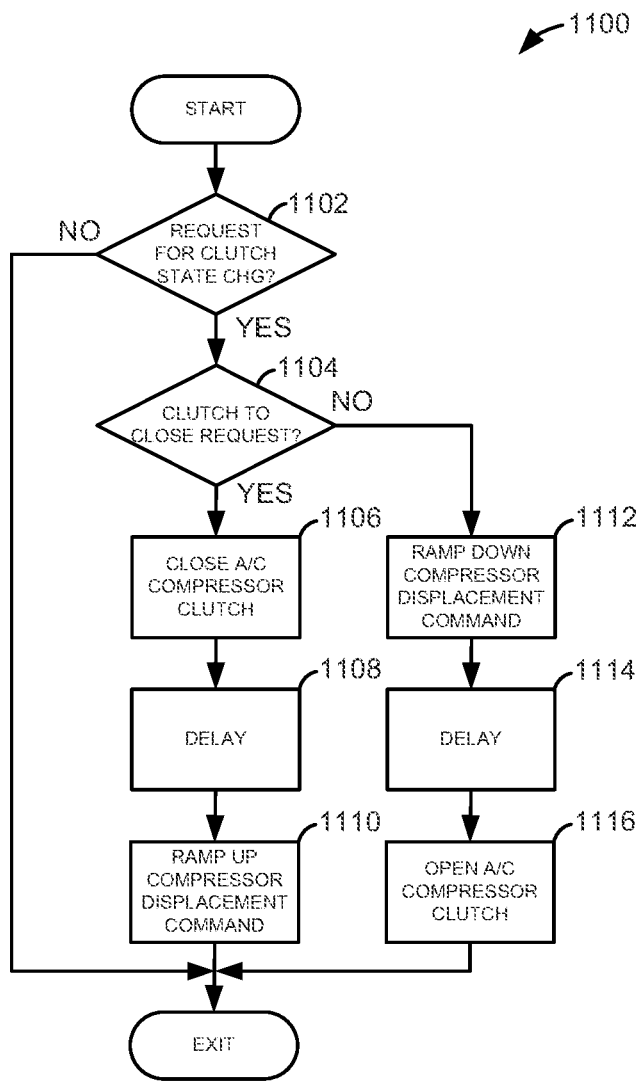
FIG. 11 shows a method for providing soft starting and stopping of a vehicle air conditioner compressor.

The present description is related to controlling an air conditioning system of a vehicle. In one non-limiting example, the air conditioning system may be configured as illustrated in FIG. 1. Further, the air conditioning system may be coupled to an engine of a vehicle as illustrated in FIG. 2. In one example, the air conditioning system is operated via a control system as illustrated in FIG. 3. FIGS. 4-6 show signals of interest during air conditioning system operation. Air conditioning system temperature can be exchanged for air conditioning system torque as illustrated in FIG. 7. Air condition system torque can be controlled as illustrated in FIG. 8C to improve vehicle operation. The methods of FIGS. 9-11 provide for controlling an air conditioning system with rapid response and smooth torque transitions between different operating modes.

Referring now to FIG. 1, air conditioning system 100 includes an evaporator 8 for cooling vehicle cabin air. Air is passed over evaporator 8 via fan 50 and directed around vehicle cabin 2. Climate controller 26 operates fan 50 according to operator settings as well as climate sensors. Temperature sensor 4 provides an indication of the temperature of evaporator 8 to climate controller 26. Cabin temperature sensor 30 provides an indication of cabin temperature to climate controller 26. Similarly, humidity sensor 32 provides climate controller 26 an indication of cabin humidity. Sun load sensor 34 provides an indication of cabin heating from sun light to climate controller 26. Climate controller also receives operator inputs from operator interface 28 and supplies desired evaporator temperature and actual evaporator temperature to energy conversion device controller 12.

Operator interface 28 allows an operator to select a desired cabin temperature, fan speed, and distribution path for conditioned cabin air. Operator interface 28 may include dials and push buttons to select air conditioning settings. In some examples, operator interface 28 may accept inputs via a touch sensitive display.

Refrigerant is supplied to evaporator 8 via evaporator valve 20 after being pumped into condenser 16. Compressor 18 receives refrigerant gas from evaporator 8 and pressurizes the refrigerant. Heat is extracted from the pressurized refrigerant so that the refrigerant is liquefied at condenser 16. The liquefied refrigerant expands after passing through evaporator valve 20 causing the temperature of evaporator 8 to be reduced.

Compressor 18 includes a clutch 24, a variable displacement control valve 22, piston 80, and swash plate 82. Piston 80 pressurizes refrigerant in air conditioning system which flows from air conditioner compressor 18 to condenser 16. Swash plate 82 adjusts the stroke of piston 80 to adjust the pressure at which refrigerant is output from air conditioner compressor 18 based on oil flow through variable displacement control valve 22. Clutch 24 may be selectively engaged and disengaged to supply air conditioner compressor 18 with rotational energy from energy conversion device 10. In one example, energy conversion device 10 is an engine supplying rotational energy to compressor 18 and wheels 60 via transmission 70. In other examples, energy conversion device 10 is an electrical motor supplying rotational energy to air conditioner compressor 18 and wheels 60 via transmission 70. Rotational energy may be supplied to air conditioner compressor 18 from energy conversion device 10 via belt 42. In one example, belt 42 mechanically couples shaft 40 to air conditioner compressor 18 via clutch 24. Shaft 40 may be an engine crankshaft, armature shaft, or other shaft.

In this way, the system of FIG. 1 provides rotational energy to an air conditioner compressor to cool the cabin of a vehicle. Specifically, the air conditioner compressor provides a negative torque to load the energy conversion device and compress the refrigerant so that the refrigerant can be subsequently expanded in order to cool the vehicle cabin. The amount of negative torque provided to the energy conversion device by the air conditioner compressor can be adjusting via the clutch and an actuator or valve that adjusts the variable displacement pump.

Referring to FIG. 2, one example of an energy conversion device is shown. In particular, energy conversion device 10 is an internal combustion engine, comprising a plurality of cylinders, one cylinder of which is shown in FIG. 1, is controlled by electronic energy conversion device controller 12. Engine 10 includes combustion chamber 230 and cylinder walls 232 with piston 236 positioned therein and connected to shaft 40 which is a crankshaft. Combustion chamber 230 is shown communicating with intake manifold 244 and exhaust manifold 248 via respective intake valve 252 and exhaust valve 254. Each intake and exhaust valve may be operated by an intake cam 251 and an exhaust cam 253. Alternatively, one or more of the intake and exhaust valves may be operated by an electromechanically controlled valve coil and armature assembly. The position of intake cam 251 may be determined by intake cam sensor 255. The position of exhaust cam 253 may be determined by exhaust cam sensor 257.

Fuel injector 266 is shown positioned to inject fuel directly into cylinder 230, which is known to those skilled in the art as direct injection. Alternatively, fuel may be injected to an intake port, which is known to those skilled in the art as port injection. Fuel injector 266 delivers liquid fuel in proportion to the pulse width of signal FPW from energy conversion device controller 12. Fuel is delivered to fuel injector 266 by a fuel system (not shown) including a fuel tank, fuel pump, and fuel rail (not shown). Fuel injector 266 is supplied operating current from driver 268 which responds to energy conversion device controller 12. In addition, intake manifold 244 is shown communicating with optional electronic throttle 262 which adjusts a position of throttle plate 264 to control air flow from air intake 242 to intake manifold 244. In one example, a low pressure direct injection system may be used, where fuel pressure can be raised to approximately 20-30 bar. Alternatively, a high pressure, dual stage, fuel system may be used to generate higher fuel pressures.

Distributorless ignition system 288 provides an ignition spark to combustion chamber 230 via spark plug 292 in response to energy conversion device controller 12. Universal Exhaust Gas Oxygen (UEGO) sensor 226 is shown coupled to exhaust manifold 248 upstream of catalytic converter 270. Alternatively, a two-state exhaust gas oxygen sensor may be substituted for UEGO sensor 226.

Converter 270 can include multiple catalyst bricks, in one example. In another example, multiple emission control devices, each with multiple bricks, can be used. Converter 270 can be a three-way type catalyst in one example.

Energy conversion device controller 12 is shown in FIG. 1 as a conventional microcomputer including: microprocessor unit 202, input/output ports 204, read-only memory 206, random access memory 208, keep alive memory 210, and a conventional data bus. Energy conversion device controller 12 is shown receiving various signals from sensors coupled to energy conversion device 10, in addition to those signals previously discussed, including: engine coolant temperature (ECT) from temperature sensor 212 coupled to cooling sleeve 214; a position sensor 284 coupled to an accelerator pedal 280 for sensing force applied by foot 282; a measurement of engine manifold pressure (MAP) from pressure sensor 222 coupled to intake manifold 244; an engine position sensor from a Hall effect sensor 218 sensing position of shaft 40; a measurement of air mass entering the engine from sensor 220; and a measurement of throttle position from sensor 258. Barometric pressure may also be sensed (sensor not shown) for processing by energy conversion device controller 12. In a preferred aspect of the present description, engine position sensor 218 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within the engine typically undergoes a four stroke cycle: the cycle includes the intake stroke, compression stroke, expansion stroke, and exhaust stroke. During the intake stroke, generally, the exhaust valve 254 closes and intake valve 252 opens. Air is introduced into combustion chamber 230 via intake manifold 244, and piston 236 moves to the bottom of the cylinder so as to increase the volume within combustion chamber 230. The position at which piston 236 is near the bottom of the cylinder and at the end of its stroke (e.g. when combustion chamber 230 is at its largest volume) is typically referred to by those of skill in the art as bottom dead center (BDC). During the compression stroke, intake valve 252 and exhaust valve 254 are closed. Piston 236 moves toward the cylinder head so as to compress the air within combustion chamber 230. The point at which piston 236 is at the end of its stroke and closest to the cylinder head (e.g. when combustion chamber 230 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 292, resulting in combustion. During the expansion stroke, the expanding gases push piston 236 back to BDC. Shaft 40 converts piston movement into a rotational torque of the rotary shaft. Finally, during the exhaust stroke, the exhaust valve 254 opens to release the combusted air-fuel mixture to exhaust manifold 248 and the piston returns to TDC. Note that the above is shown merely as an example, and that intake and exhaust valve opening and/or closing timings may vary, such as to provide positive or negative valve overlap, late intake valve closing, or various other examples.

FIG. 3 is a block diagram of a controller for operating an air conditioning system of a vehicle. The controller may be executed via instructions in electronic controller 12 operating in the systems described by FIGS. 1 and 2. Controller 300 includes a first section 302-332 and 350 for adjusting displacement of a variable displacement air conditioner compressor (e.g., compressor 18 of FIG. 1). Controller 300 includes a second section 340-344 for adjusting air conditioner compressor clutch state which allows rotational energy to be selectively transferred to an air conditioner compressor.

At 302, desired evaporator temperature is input to controller 300. In one example, the desired evaporator temperature may be requested from a climate control module in response to operator inputs and air conditioning system inputs. Further, the desired evaporator temperature can converge to an evaporator control temperature when the air conditioner compressor clutch is activated. The desired evaporator temperature can converge to ambient temperature when the air conditioner compressor clutch is not activated. The desired evaporator temperature is directed to 304 and 350.

At 350, a feed forward gain is applied to the desired evaporator temperature. In one example, the gain is empirically determined and stored in memory. For example, if the desired evaporator temperature is 20° C., a displacement valve command of 60% duty cycle may be extracted from a table that is indexed via the 20° C. desired evaporator temperature. The 60% duty cycle may then be directed to the displacement valve. In one example, the feed forward gain may be indexed via one or more of the variables of fan speed, desired evaporator temperature, ambient temperature, and solar load. The feed forward gain is directed from 350 to 326.

At 304, controller 300 determines an expected evaporator temperature in response to the desired evaporator temperature, sensed evaporator temperature, and air conditioner compressor clutch state. In one example, the expected evaporator temperature is determined according to the state of the air conditioner compressor clutch.

During air conditioner compressor clutch off conditions, the expected evaporator temperature (exp_evp_tmp) is given by exp_evp_tmp (K)=filt_dsd_evp_tmp (K−n). Where K is an integer representing the $K^{th}$ determination of exp_evp_tmp, n is an integer representing a delay time between the present determination of exp_evp_tmp and filt_dsd_evp_tmp, and where filt_dsd_evp_tmp is the filtered desired evaporator temperature. The delay n may be empirically determined and stored in controller memory via commanding the air conditioner compressor clutch to an off state from a clutch on state and recording an amount time before the evaporator reaches a final temperature that is based on ambient conditions. The amount of time to reach ambient temperature is a function of the evaporator volume, fan speed, initial evaporator temperature, and ambient conditions. Thus, exp_evp_tmp (K) takes on the value of filt_dsd_evp_tmp delayed by n execution cycles of controller 300.

In one example, filt_dsd_evp_tmp is determined from the desired evaporator temperature and first order filter expressed as filt_dsd_evp_tmp (K)=filt_dsd_evp_tmp (K−1)+(1−$\tau_{off}$)·(dsd_evp_tmp (K)−filt_dsd_evp_tmp (K−1)). Where dsd_evp_tmp is desired evaporator temperature from 302, K is an integer representing the $K^{th}$ determination of filt_dsd_evp_tmp, $\tau_{off}$ is related to an air conditioner compressor off filter time constant and the sampling rate of desired evaporator temperature. The air conditioner compressor off filter time constant represents a rise rate of desired evaporator temperature from the present evaporator temperature to the final evaporator temperature. The final evaporator temperature may be estimated as ambient temperature while the present evaporator temperature may be sensed at 308. The air conditioner compressor off filter time constant may be empirically determined and stored in a table or function that is indexed via the present evaporator temperature and the final evaporator temperature.

In this way, desired evaporator temperature is filtered and delayed before being used to determine an error between the desired evaporator temperature and the actual evaporator temperature. By converting the desired evaporator temperature into an expected evaporator temperature, the feedback section (e.g., 306-332) of controller 300 can compensate for the delay time and the time constant of the physical system shown in FIGS. 1 and 2 via allowing the actual evaporator temperature to reach the desired evaporator temperature before taking additional control actions beyond feed forward gain operating on the desired evaporator temperature. Further, an observed output of the air conditioning system illustrated in FIGS. 1 and 2 does not have to be modeled and directed through a delay to compare with the actual evaporator temperature as would be done with a Smith Predictor. Instead, the control system input desired evaporator temperature is modified before being used to provide an evaporator temperature error signal or value.

During air conditioner compressor clutch on conditions, the expected evaporator temperature (exp_evp_tmp) is given by exp_evp_tmp (K)=filt_dsd_evp_tmp (K−m). Where K is an integer representing the $K^{th}$ determination of exp_evp_tmp, m is an integer representing a delay between the present determination of exp_evp_tmp and filt_dsd_evp_tmp, and where filt_dsd_evp_tmp is the filtered desired evaporator temperature. The delay m may be empirically determined and stored in controller memory via commanding the air conditioner compressor clutch to an on state and recording an amount time before the evaporator reaches a final drawdown temperature that is based on the air conditioner compressor pump displacement and ambient conditions. Thus, exp_evp_tmp (K) takes on the value of filt_dsd_evp_tmp delayed by m execution cycles of controller 300.

In one example, filt_dsd_evp_tmp is determined from the desired evaporator temperature and first order filter expressed as filt_dsd_evp_tmp (K)=filt_dsd_evp_tmp (K−1)+(1−$\tau_{on}$)·(dsd_evp_tmp (K)−filt_dsd_evp_tmp (K−1)). Where dsd_evp_tmp is desired evaporator temperature from 302, K is an integer representing the $K^{th}$ determination of filt_dsd_evp_tmp, $\tau_{on}$ is related to an air conditioner compressor on filter time constant and the sampling rate of desired evaporator temperature. The air conditioner compressor on filter time constant represents a drop rate of desired evaporator temperature from the present evaporator temperature to the desired evaporator temperature. The air conditioner compressor on filter time constant may be empirically determined and stored in a table or function that is indexed via the present evaporator temperature and the desired evaporator temperature.

Thus, expected evaporator temperature can be determined and updated whether the air conditioner compressor clutch is engaged or disengaged. As such, the feedback section (e.g., 306-332) of controller 300 operates based on the expected evaporator temperature rather than a difference between a desired evaporator temperature and an actual evaporator temperature. By modifying the desired evaporator temperature to provide an expected evaporator temperature, controller 300 can mitigate the possibility of over correcting or driving the air conditioner compressor displacement command.

At 308, evaporator temperature is sensed or estimated. In one example, evaporator temperature is sensed via a thermocouple or a thermister as indicated in FIG. 1. The sensed evaporator temperature is passed on to 304, 306, and 342.

At 306, actual evaporator temperature is subtracted from expected evaporator temperature to provide an evaporator temperature error. The evaporator temperature error is a basis for feedback adjustments to the displacement of the variable displacement air conditioner compressor. Evaporator temperature error is directed to 310.

At 310, controller 300 judges whether or not to evaporator temperature error is greater than a threshold level. If so, controller 300 proceeds to 318. Otherwise, controller 300 proceeds to 310. Thus, if the evaporator temperature error is less than the threshold, a PID controller operates on the evaporator temperature error. Otherwise, a high gain no memory gain operates on the evaporator temperature error.

In an alternative example, controller 300 may supply evaporator temperature error to both paths comprising 318, 312, 314, and 316 during selected operating conditions. For example, if evaporator temperature error is less than 5° C. but more than 3° C., 318, 312, 314, and 316 may receive the evaporator temperature error value. However, if evaporator temperature error is greater than 5° C., only 318 receives the evaporator temperature error value. Further, if evaporator temperature error is less than 3° C., only 312, 314, and 316 receive the evaporator temperature error value.

At 318, the evaporator temperature error is multiplied by a high gain. The high gain may be linear, quadratic, or of a higher order. Alternatively, the high gain may be a single value for negative evaporator temperature errors or a single value for positive evaporator temperature errors. In one example, high gain determined from a function or table stored in memory that is indexed via evaporator temperature error. For example, if the evaporator temperature error is 10° C., a table is indexed using 10° C. and the variable displacement control valve command is adjusted by 15%. The high gain at 318 contains no memory so that only the present evaporator temperature error is operated on by controller 300 and not past errors in evaporator temperature. The gain output from 318 is supplied to 322.

At 322, controller 300 limits rate increases in the variable displacement control valve command. Further, in some examples controller 300 applies a low pass filter to adjustments for the variable displacement control valve. For example, if a change in the variable displacement control valve is greater than 40%, the change in the variable displacement control command is held at 40%. Further, the change may be filtered to smooth adjustments to the variable displacement command. The limited variable displacement control valve command is directed to summing junction 326.

At 312, controller 300 proportionally adjusts the evaporator temperature error signal by multiplying it by a proportional amount to provide a proportional air conditioner compressor displacement command adjustment term. For example, if the evaporator temperature error is 10° C., it may be multiplied by 0.5 to provide a value of 5. The proportionately adjusted evaporator temperature error is directed to summing junction 324.

At 314, controller 300 integrates the evaporator temperature error and then multiplies the integrated temperature error by a predetermined value to provide an integral air conditioner compressor displacement command adjustment term. In one example, the evaporator temperature error may be integrated via a trapezoidal method of integration. Thus, the integrated amount includes present and past values of evaporator temperature error and is therefore considered to have memory of past evaporator temperature error. The integrated evaporator temperature error is directed to windup limiter 320.

At 320, controller 300 limits the maximum value of the integrated evaporator temperature error so that if the evaporator temperature error changes sign, controller 300 may respond quickly without having to clear a large integrated value of evaporator temperature. Output from windup limiter 320 is directed to summing junction 324.

At 316, controller 300 takes a derivative of evaporator temperature error and multiplies it by a predetermined value to provide a derivative air conditioner compressor displacement command adjustment term. In one example, the derivative is determined from a change between a present and a most recent past evaporator temperature error as well as the time between samples. For example, the derivative term may be determined as evap_deriv=(evap_tmp_error (K−1)−evap_tmp_error(K))/D where K is the present sample number and D is the number of seconds per sample. The derivative term is directed to summing junction 324.

At 324, the proportional, derivative, and integral terms are summed to provide an output to the PID portion of controller 300. Thus, when the evaporator error is less than a threshold level, the evaporator error is operated on via a PID controller. However, in some examples, if the evaporator error is greater than a threshold level, the output of summer 324 is forced to zero. The output from summer 324 is directed to summer 326.

At 326, the output of the feed forward gain at 350 is added to the output of the PID controller as summed at 324 and the output of high gain limiter 322. Thus, during some conditions, controller 300 provides a control signal that is based on feed forward gain and high gain control without using memory in the control output. During other conditions, controller 300 provides a control signal that is based on feed forward gain and a PID section that includes using memory to determine the control output. Thus, controller 300 includes memory based output and memory-less output. Controller 300 directs the output of summer 326 to 328.

At 328, controller 300 provides a soft start and stop feature that acts to reduce disturbances to the energy conversion device supplying rotational energy to the air conditioner compressor. In particular, when controller 300 judges to activate the air conditioner compressor clutch to couple the air conditioner compressor to the energy conversion device, the air conditioner compressor displacement valve is commanded to a reduced or minimum displacement before the air conditioner compressor clutch is engaged. The air conditioner compressor displacement valve is commanded to an increased value a predetermined amount of time after the air conditioner compressor clutch has been engaged. In one example, the air conditioner compressor displacement is gradually adjusted, such as by filtering the command, or ramped, to a duty cycle as output from 326 after a predetermined amount of time since the air conditioner compressor clutch is engaged.

Conversely, when controller 300 judges to deactivate the air conditioner compressor clutch to uncouple the air conditioner to the energy conversion device, the air conditioner compressor displacement valve is commanded to a reduced or minimum displacement before the air conditioner compressor clutch is disengaged. The air conditioner compressor displacement valve is commanded to a decreased value a predetermined and the air conditioner compressor clutch is disengaged a predetermined amount of time after the air conditioner compressor displacement is degreased to a lower or minimum displacement. In one example, the air conditioner compressor displacement is ramped as soon as it is decided to disengage the air conditioner compressor clutch. The soft start or stop adjusted air conditioner compressor displacement control value is routed from 328 to 330.

At 330, controller 300 controls air conditioner torque in response to powertrain torque requirements and available energy conversion device torque as described in greater detail with regard to FIGS. 9-10. During some vehicle operating conditions, it may be desirable to reduce the negative or resistive torque that the air conditioner compressor applies to the energy conversion device so that additional torque may be supplied by the energy conversion device to propel the vehicle or increase the output of other vehicle systems. For example, during a condition where an operator substantially depresses an accelerator pedal, it may be desirable to reduce the amount of energy conversion device torque consumed by the air conditioner compressor. In another example, a load of an alternator may increase to a level where it is desirable to reduce the torque supplied to the air conditioner compressor to increase alternator output. In still another example, it may be desirable to reduce torque supplied to an air conditioner compressor during engine idle conditions where MAP pressure is greater than a threshold so that MAP may be reduced to increase brake booster vacuum. Thus, there are many conditions where it may be desirable to reduce torque supplied to an air conditioner compressor.

One way to reduce torque supplied to an air conditioner compressor is to open the air conditioner clutch. FIG. 8B described below in greater detail describes how driveline torque can be increased when there is an increasing request for additional driveline torque from the energy conversion device.

In another example, as described in greater detail with regard to FIGS. 8C and 10, air conditioner negative torque applied to the energy conversion device can be reduced in response to an amount of requested driveline torque increase. By reducing air conditioner compressor negative torque in proportion to an increase in requested driveline torque, air conditioning cooling capacity can be reduced so that the requested drive line torque may be provided. Similarly, compressor torque may be adjusted responsive to other energy conversion device torque requests. For example, compressor torque may be reduced in response to a power take off device for operating a hydraulic pump, and/or an alternator load, and/or a power steering torque demand, and/or a request for additional engine vacuum. Controller 300 supplies an adjusted air conditioner compressor displacement command to 332 after air conditioner compressor torque may be limited responsive to other torque demands on the energy conversion device.

At 332, controller 300 adjusts stroke of the air conditioner compressor piston via the displacement command to change the pressure output of the air conditioner compressor. In one example, air conditioner displacement command is adjusted via varying a duty cycle of a waveform controlling a valve (e.g., 20 of FIG. 1) that regulates fluid flow to control air conditioner compressor piston stroke. In other examples, an electrical motor or solenoid may be supplied a varying voltage so as to control air conditioner compressor pressure capacity.

In this way, controller 300 adjusts the variable displacement air conditioner compressor to provide varying levels of air conditioner evaporator cooling capacity while at the same time controlling the torque that the air conditioner compressor applies to an energy conversion device. In particular, the evaporator cooling capacity may be increased by increasing the stroke of the air conditioner compressor piston, thereby increasing the pressure output of the air conditioner compressor.

At 340, controller 300 receives operator and system inputs for controlling a clutch of an air conditioner compressor that selectively allows rotational energy to be supplied from an energy conversion device to the air conditioner compressor. In one example, the operator and system inputs include but are not limited to solar load, fan speed command, cabin temperature demand, evaporator temperature, humidity sensor, climate control mode (e.g., cool; heat; defrost). Operator and system inputs are passed from 340 to 342.

At 342, controller 300 applies logic to determine whether or not to actuate an air conditioner clutch so that the air conditioner compressor can pressurize refrigerant to reduce the temperature of an evaporator (e.g., evaporator 8 of FIG. 1). For example, if desired vehicle cabin temperature is greater than actual cabin temperature, the air conditioner compressor clutch can be activated to allow rotational energy to be transferred from an energy conversion device to the air conditioner compressor so that evaporator temperature may be lowered, thereby reducing vehicle cabin temperature. Further, when the vehicle cabin temperature is cooled to a level that is less than the desired vehicle cabin temperature, the air conditioner compressor clutch can be deactivated to stop rotational energy from being transferred from the energy conversion device to the air conditioner compressor. Controller 300 adjusts air conditioning clutch state by directing signals to 344.

At 344, controller 300 adjusts the state of an air conditioner compressor clutch. In one example, the air conditioner compressor clutch is electromechanically actuated. In another example, the air conditioner compressor clutch may be hydraulically actuated. Thus, electrical current or hydraulic fluid may be used to activate or deactivate the air conditioner clutch. Further, the air conditioner compressor clutch command state output at 344 may be delayed from the desired air conditioner compressor clutch state determined at 342 in order to facilitate a soft start/stop of the air condition system and air conditioner compressor. The amount of delay time may be constant or vary with air conditioning system operating conditions as described with regard to FIGS. 5 and 6.

Referring now to FIG. 4, an example plot of simulated signals of interest during air conditioning system operation is shown. The signals of FIG. 4 may be provided via controller 12 of FIGS. 1 and 2 executing instructions of the controller described in FIG. 3.

FIG. 4 includes two plots. The first plot from the top of FIG. 4 is a plot of evaporator temperature versus time. The X axis represents time and time increases from left to right. The Y axis represents evaporator temperature and evaporator temperature increases in the direction of the Y axis arrow. Curve 402 represents desired air conditioner evaporator temperature (e.g., 302 of FIG. 3). Curve 404 represents expected air conditioner evaporator temperature (e.g., 304 of FIG. 3). Line 410 represents an air conditioner evaporator control temperature level (e.g., a temperature the air conditioning evaporator is controlled to when the air conditioner compressor clutch is activated).

The second plot from the top of FIG. 4 is a plot of air conditioner compressor clutch state. The X axis represents time and time increases from left to right. The Y axis represents air conditioner compressor clutch state and air conditioner compressor clutch state is open near the X axis (e.g., a low level) and air conditioner compressor clutch state is closed near the Y axis arrow (e.g., high level).

At time $T_0$, the air conditioner compressor clutch is activated and the desired evaporator temperature 402 (e.g., 302 of FIG. 3) as provided by a climate controller (e.g., 26 of FIG. 1) and the expected evaporator temperature 404 (e.g., 304 of FIG. 3) are near the air conditioner evaporator control temperature level 410.

At time $T_1$, the air conditioner compressor clutch is cycled off so that rotational energy from an energy conversion device is not transferred to the air conditioner compressor. The air conditioner compressor clutch may be cycled off to conserve energy, in response to a request from the vehicle operator, or in response to other air conditioning system input.

At time $T_2$, the desired air conditioner evaporator temperature 402 begins to move away from the air conditioner evaporator control temperature 410 since the air conditioner compressor clutch is disengaged.

At time $T_3$, the expected air conditioner evaporator temperature 404 begins to increase. The rate of expected air conditioner evaporator temperature increase can be less than or equal to the rate of desired air conditioner evaporator temperature increase depending on the filter time constant selected at 304 of FIG. 3. Similarly, the rate of expected air conditioner evaporator temperature decrease can be less than or equal to the rate of desired air conditioner evaporator temperature decrease depending on the filter time constant selected at 304 of FIG. 3. The time between $T_1$ and $T_2$ represents the time delay selected at 304 of FIG. 3.

At time $T_4$, the air conditioner compressor clutch is reactivated so that rotational energy is transferred from the energy conversion device to the air conditioner compressor. Shortly thereafter, the desired evaporator temperature 402 and the expected evaporator temperature 404 begin to be reduced.

Thus, the expected evaporator temperature 404 is delayed from the desired evaporator temperature so that the evaporator temperature error (e.g., 306 of FIG. 3) is more closely related to the actual evaporator temperature. Consequently, oscillations in controller output and actual temperature may be reduced even though there may a significant phase delay from the desired evaporator temperature and the actual evaporator temperature. Further, the magnitude of the desired evaporator temperature may be reduced during dynamic conditions so as to reduce the possibility of over driving the air conditioner compressor displacement command (e.g., 332 of FIG. 3) during dynamic conditions.

Referring now to FIG. 5, an example plot of simulate signals of interest during air conditioner activation is shown. In particular, an example soft start of an air conditioning system is shown. The signals of FIG. 5 may be provided via controller 12 of FIGS. 1 and 2 executing instructions of the controller described in FIG. 3.

FIG. 5 includes three plots. The first plot from the top of FIG. 5 is a plot of an air conditioner compressor piston displacement or stroke control signal (e.g., 328 of FIG. 3) versus time. The pumping pressure capacity of the air conditioner compressor increases as the piston displacement command increases. The X axis represents time and time increases from left to right. The Y axis represents compressor displacement command and the air conditioner compressor displacement command increases in the direction of the Y axis arrow, thereby increasing compressor pressure capacity.

The second plot from the top of FIG. 5 is a plot of desired air conditioner compressor clutch state. The X axis represents time and time increases from left to right. The Y axis represents desired air conditioner compressor clutch state and desired compressor clutch state is open near the X axis (e.g., a low level) and desired compressor clutch state is closed near the Y axis arrow (e.g., high level). The desired air conditioner clutch state may be determined according to air conditioner inputs as described at 342 of FIG. 3.

The third plot from the top of FIG. 5 is a plot of air conditioner compressor clutch command state. The X axis represents time and time increases from left to right. The Y axis represents air conditioner compressor clutch command state and compressor clutch command state opens the air conditioner compressor clutch near the X axis (e.g., a low level) and compressor clutch command state closes the air conditioner compressor clutch near the Y axis arrow (e.g., high level). The desired air conditioner clutch state may be determined according to air conditioner inputs as described at 342 of FIG. 3.

At time $T_0$, the desired air conditioner compressor clutch state is at a low level indicating that the air conditioner clutch is not to be activated. The air conditioner compressor clutch command state is also at a low level indicating that the air conditioner clutch is not activated. Further, the air conditioner compressor displacement command signal is also at a low level, thereby reducing the air conditioner compressor pressure capacity and the amount of torque applied to the energy conversion device.

At time $T_1$, the desired air conditioner compressor clutch state is cycled on so that rotational energy from an energy conversion device can be transferred to the air conditioner compressor. The air conditioner compressor clutch may be cycled on to start the air conditioning reducing vehicle cabin temperature or after the air conditioner compressor has been cycled off based on air conditioning system inputs. The air conditioner compressor clutch command state remains at a low level indicating that the air conditioner clutch is not immediately activated when the desired air conditioner compressor clutch state is changed. Further, the air conditioner compressor displacement command remains at a low or minimum level so that compressor pressure capacity is at a low or minimum level.

At time $T_2$, the desired air conditioner compressor clutch state remains in a state to engage the air conditioner compressor clutch. The air conditioner compressor clutch command state transitions to a high level indicating that the air conditioning clutch is commanded to an active engaged state where rotational energy from the energy conversion device is transferred to the air conditioner compressor. However, the air conditioner compressor displacement control signal remains at a lower or minimum level so that when the air conditioner compressor clutch is engaged, a low level torque is applied to the energy conversion device. Thus, during air conditioner compressor clutch engagement, only a small load is applied to the energy conversion device from the air conditioner compressor.

At time $T_3$, the desired air conditioner compressor clutch state and the air conditioner compressor clutch command state are held at higher levels. Further, the air conditioner compressor displacement command signal begins to be ramped from the low or minimum level to a level that provides the desired evaporator temperature.

The time between $T_2$ and $T_3$ may be a constant or it may be adjusted in response to air conditioning system or energy conversion device operating conditions. For example, the time from $T_2$ to $T_3$ may be a first amount of time when engine speed is a first engine speed, and the time from $T_2$ to $T_3$ may be a second amount of time, the second amount of time shorter than the first amount of time, when engine speed is a second engine speed, the second engine speed greater than the first engine speed. Further, the time may be increased as the difference between the initial and final evaporator temperatures increases. In other words, the ramp rate between initial evaporator temperature and final evaporator temperature can be adjusted according to energy conversion device conditions, air conditioning system conditions, and vehicle conditions.

For example, when the energy conversion device coupled to the air conditioner compressor is an engine, the air conditioner compressor displacement command signal may ramp up at a first rate when the air conditioner compressor is activated at engine idle speed and load (e.g., 800 RPM and 0.12 load). On the other hand, when the engine is operating at a higher speed and load (e.g., 2000 RPM and 0.3 load), the air conditioner compressor displacement control signal may ramp up at a second rate, the second rate greater than the first rate. The air conditioner compressor displacement control signal may ramp up at a higher rate during conditions where the faster ramp rate is less likely to be noticed by the operator. Further, the ramp up rate may be increased during conditions where the energy conversion device can react faster to counteract the additional compressor torque. For example, as mentioned above, a compressor displacement command may be ramped up faster so as to increase compressor pressure capacity when an engine is operated at speeds above idle speed since higher engine speed provides additional combustion events, thereby reducing the time it takes between and engine control adjustment and torque to counteract the air conditioner compressor torque.

A different compressor displacement ramping up strategy may be provided when the air conditioner compressor is coupled to an electric motor. For example, the air conditioner compressor displacement command ramp up rate may be increased at a first rate when the motor speed is less than base speed (e.g., motor speed where full motor torque is available and above which less than full motor torque is available). However, if the electric motor is at a speed greater than base speed, the air conditioner compressor displacement command ramp up rate may be reduced as compared to the first rate to account for less available motor torque at higher motor speeds.

In addition, the air conditioner compressor displacement ramp up rate may be adjusted depending on air conditioner system operating conditions. For example, the ramp up rate may be increased when the difference between an initial evaporator temperature and a final or desired evaporator temperature is less than a first threshold (e.g., 10° C.). The ramp up rate may be decreased when the difference between the initial evaporator temperature and the desired evaporator temperature is greater than a second threshold (e.g., 15° C.).

The time between $T_2$ and $T_3$ allows the torque transfer amount from the engine to the air conditioner compressor to stabilize before the air conditioner compressor displacement is adjusted. The amount of time between $T_2$ and $T_3$ can be adjusted for air conditioner system operating conditions, vehicle operating conditions, and energy conversion device conditions. For example, the time between $T_2$ and $T_3$ can be increased if the energy conversion device has been operating for less than a predetermined amount of time. In an alternative example, the time between $T_2$ and $T_3$ can be increased when the energy conversion device is an engine operating with fewer than its total number of cylinders. In particular, when the engine is operating with deactivated cylinders the time between $T_2$ and $T_3$ can be increased as compared to when the engine is operating with a greater number or all engine cylinders.

In this way, the possibility of large increases in torque between the energy conversion device and the air conditioner compressor may be reduced. As a result, activation of the air conditioner system activation may be less noticeable to a driver.

Referring now to FIG. 6, an example plot of simulated signals of interest during air conditioner deactivation is shown. In particular, an example soft stop of an air conditioning system is shown. The signals of FIG. 6 may be provided via controller 12 of FIGS. 1 and 2 executing instructions of the controller described in FIG. 3.

FIG. 6 includes three plots. The first plot from the top of FIG. 6 is a plot of a compressor piston displacement or stroke control signal (e.g., 328 of FIG. 3) versus time. The pumping pressure capacity of the air conditioner compressor increases as the piston displacement command increases. The X axis represents time and time increases from left to right. The Y axis represents compressor displacement command and the air conditioner compressor displacement command increases in the direction of the Y axis arrow, thereby increasing compressor pressure capacity.

The second plot from the top of FIG. 6 is a plot of desired air conditioner compressor clutch state. The X axis represents time and time increases from left to right. The Y axis represents desired air conditioner compressor clutch state and desired compressor clutch state is open near the X axis (e.g., a low level) and desired compressor clutch state is closed near the Y axis arrow (e.g., high level). The desired air conditioner clutch state may be determined according to air conditioner inputs as described at 342 of FIG. 3.

The third plot from the top of FIG. 6 is a plot of air conditioner compressor clutch command state. The X axis represents time and time increases from left to right. The Y axis represents air conditioner compressor clutch command state and compressor clutch command state opens the air conditioner compressor clutch near the X axis (e.g., a low level) and compressor clutch command state closes the air conditioner compressor clutch near the Y axis arrow (e.g., high level). The desired air conditioner clutch state may be determined according to air conditioner inputs as described at 342 of FIG. 3.

At time $T_0$, the desired air conditioner compressor clutch state is at a higher level indicating that the air conditioner clutch is activated. The air conditioner compressor clutch command state is also at a higher level indicating that the air conditioner clutch is activated. Further, the air conditioner compressor displacement command signal is also at a higher level, thereby increasing the air conditioner compressor pressure capacity and the amount of torque applied to the energy conversion device.

At time $T_1$, the desired air conditioner compressor clutch state is cycled off so that rotational energy from an energy conversion device cannot be transferred to the air conditioner compressor, but the air conditioner compressor clutch remains engaged at $T_1$. The air conditioner compressor clutch may be cycled off to stop the air conditioning so that vehicle cabin temperature can be increased or to reduce energy consumption. The air conditioner compressor clutch command state remains at a higher level indicating that the air conditioner clutch is not immediately deactivated when the desired air conditioner compressor clutch state is changed. Further, the air conditioner compressor displacement command remains at a higher level so that compressor pressure capacity remains higher.

At time $T_2$, the desired air conditioner compressor clutch state is held at lower level. However, the air conditioner compressor clutch command state is held at a higher level so that the air conditioner compressor clutch remains engaged to allow torque transfer from the electric energy conversion device to the air conditioner compressor. In addition, the air conditioner compressor displacement command signal begins to be ramped from the higher level to a lower or minimum level that provides reduced compressor output pressure and less compressor torque.

The time between $T_1$ and $T_2$ may be a constant or it may be adjusted in response to air conditioning system or energy conversion device operating conditions. For example, the time from $T_1$ to $T_2$ may be a first amount of time when engine speed is a first engine speed, and the time from $T_1$ to $T_2$ may be a second amount of time, the second amount of time shorter than the first amount of time, when engine speed is a second engine speed, the second engine speed greater than the first engine speed. Further, the time may be increased as the difference between the initial and final evaporator temperatures increases. In other words, the ramp rate between initial evaporator temperature and final evaporator temperature can be adjusted according to energy conversion device conditions, air conditioning system conditions, and vehicle conditions.

For example, when the energy conversion device coupled to the air conditioner compressor is an engine, the air conditioner compressor displacement command signal may ramp down at a first rate when the air conditioner compressor is deactivated at engine idle speed and load (e.g., 800 RPM and 0.12 load). On the other hand, when the engine is operating at a higher speed and load (e.g., 2000 RPM and 0.3 load), the air conditioner compressor displacement control signal may ramp down at a second rate, the second rate greater than the first rate. The air conditioner compressor displacement control signal may ramp down at a higher rate during conditions where the faster ramp down rate is less likely to be noticed by the operator. Additionally, the air conditioner compressor displacement command ramp down rate may be increased during conditions where the energy conversion device can react faster to counteract the additional air conditioner compressor torque. For example, as mentioned above, an air conditioner compressor displacement command may be ramped down faster so as to decrease air conditioner compressor pressure capacity when an engine is operated at speeds above idle speed since higher engine speed provides additional combustion events, thereby reducing the time it takes between and engine control adjustment and torque to counteract the air conditioner compressor torque.

A different air conditioner compressor displacement ramping down strategy may be provided when the air conditioner compressor is coupled to an electric motor. For example, the air conditioner compressor displacement command ramp down rate may be increased at a first rate when the motor speed is less than base speed (e.g., motor speed where full motor torque is available and above which less than full motor torque is available). However, if the electric motor is at a speed greater than base speed, the air conditioner compressor displacement command ramp down rate may be reduced as compared to the first rate to account for less available motor torque at higher motor speeds.

In addition, the air conditioner compressor displacement ramp down rate may be adjusted depending on air conditioner system operating conditions. For example, the ramp down rate may be increased when the difference between an initial evaporator temperature and a final or desired evaporator temperature is less than a first threshold (e.g., 10° C.). The ramp rate may be decreased when the difference between the initial evaporator temperature and the desired evaporator temperature is greater than a second threshold (e.g., 15° C.).

At time $T_3$, the desired air conditioner compressor clutch state remains in a state to disengage the air conditioner compressor clutch. Further, the air conditioner compressor displacement control signal has transitioned to a lower level so that when the air conditioner compressor clutch is disengaged, a low level torque is decoupled from the energy conversion device. The air conditioner compressor clutch command state also transitions to a lower level at time $T_3$ indicating that the air conditioning clutch is commanded to a disengaged state where rotational energy from the energy conversion device is not transferred to the air conditioner compressor. Thus, during air conditioner compressor clutch disengagement, only a small load is uncoupled from the energy conversion device.

The time between $T_2$ and $T_3$ allows the torque transfer amount from the energy conversion device to the air conditioner compressor to stabilize before the air conditioner compressor is decoupled from the energy conversion device. The amount of time between $T_2$ and $T_3$ can be adjusted for air conditioner system operating conditions, vehicle operating conditions, and energy conversion device conditions. For example, the time between $T_2$ and $T_3$ can be increased if the energy conversion device has been operating for less than a predetermined amount of time. In an alternative example, the time between $T_2$ and $T_3$ can be increased when the energy conversion device is an engine operating with fewer than its total number of cylinders. In particular, when the engine is operating with deactivated cylinders the time between $T_2$ and $T_3$ can be increased as compared to when the engine is operating with a greater number or all engine cylinders.

In this way, the possibility of large reductions in torque between the energy conversion device and the air conditioner compressor may be reduced. As a result, deactivation of the air conditioner system activation may be less noticeable to a driver.

Referring now to FIG. 7, a simulated plot illustrating air conditioning system control temperature versus air conditioning system torque is shown. The Y axis represents evaporator temperature. The X axis represents allowed air conditioning system torque consumption (e.g., torque consumed from an energy conversion device when an air conditioner compressor clutch is engaged and an air conditioner compressor displacement command is provided to an air conditioner compressor).

Marker 708 represents an amount of torque an air conditioner compressor applies to an energy conversion device when an air conditioner compressor clutch is not engaged. The small amount of torque is the torque it takes to rotate the belt and the clutch hub. Marker 710 represents an amount of torque an air conditioner compressor applies to the energy conversion device when the air conditioner compressor clutch is engaged and when the air conditioner compressor displacement command is at a minimum level. The amount of torque that is applied to the energy conversion device increases since there is additional mass that rotates when the air conditioner compressor clutch is engaged and since the air conditioner compressor has some pumping capacity, albeit small when the air conditioner compressor displacement command is at a minimum level.

Marker 714 represents freezing temperature of water. Marker 712 represents an ambient temperature. Of course, ambient temperature can vary such that the shape of temperature curve 702 flattens out as ambient temperature decreases. Further, curve 702 may be steeper in the center section when ambient temperature is increased. Finally, ambient temperature can affect the lowest temperature that may be reached when the air conditioner compressor is operated at full capacity.

Curve 702 represents evaporator temperature and evaporator temperature is reduced as the torque the air conditioner compressor applies to the energy conversion device increases. Curve 702 reaches a minimum value when air conditioner compressor torque is at its highest level. Thus, it can be observed that the air conditioner compressor may provide a small load to an energy conversion device when the air conditioner compressor displacement command is at a lower level. Alternatively, the air conditioner compressor may provide an increased load to the energy conversion device when the air conditioner compressor displacement command is at a higher level. Therefore, it may be desirable to first apply the air conditioner compressor load to the energy conversion device with the air conditioner compressor displacement command at a lower level so that a change in torque is less perceivable to an operator.

Vertical marker 704 represents an amount of air conditioner torque that is permissible while powertrain torque requirements (e.g., driver demand torque and engine accessory torque) are met by the energy conversion device. For example, an energy conversion device may have 400 N-M of brake torque available at its crankshaft at a particular engine speed and an air conditioner compressor may apply 30 N-M of torque to the energy conversion device when the air conditioner compressor clutch is engaged and when the air conditioner compressor displacement command is at a maximum or a higher level. If the driver demand torque (e.g., driveline torque output to vehicle wheels as requested by a driver via an accelerator pedal) and engine accessory torque (e.g., all accessory loads except the air conditioner including but not limited to alternator torque, power steering torque, and vacuum pump torque) is 380 N-M, then 20 N-M of air conditioner torque is permissible while still meeting driver demand torque and engine accessory torque. Thus, the air conditioner compressor may be operated at 67% of capacity while still providing driver demand torque and engine accessory torque at full level. The area to the left of vertical marker 704 is region where powertrain torque requirements may be met, but where less than full air conditioner compressor and air conditioning cooling capacity is available. The area to the right of vertical marker 704 is a region where powertrain torque requirements will not be met if the air conditioner compressor is operated at a higher level of torque.

Horizontal marker 706 represents an evaporator temperature that may be achieved when the air conditioner compressor torque is at a level that provides for powertrain torque requirements. The area above marker 706 represents a range of evaporator temperature that is available when the air conditioner compressor torque is at a level where powertrain torque requirements can be met with the air conditioner operating at or below the air conditioner torque for meeting powertrain requirements. The area below marker 706 is a range of evaporator temperature that is not available when the air conditioner compressor torque is at a level where powertrain torque requirements can be met.

Thus, the plot of FIG. 7 shows that air conditioner cooling capacity can be adjusted to meet powertrain requirement. In one example as described by FIG. 10, full air conditioner cooling capacity is available until powertrain torque requirements meet a threshold level. If the powertrain torque requirements exceed the threshold level, the air conditioner compressor displacement command is adjusted such that air conditioner compressor torque decreases proportionally with the powertrain torque requirement that exceeds the threshold level.

Figure 8A:
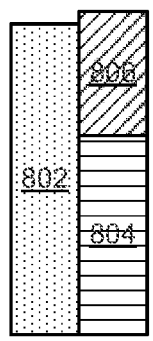
FIGS. 8A-8C are bar graphs illustrating examples of air conditioning torque control.
Figure 8B:
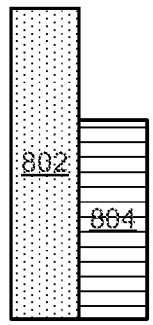

Referring now to FIG. 8A, a bar graph that illustrates a condition where powertrain torque requirements and air conditioner compressor torque exceed the amount of available energy conversion device brake torque (e.g., engine brake torque) is shown. Specifically, bar 802 represents an amount of available energy conversion device brake torque available. Bar 804 represents an amount of powertrain requested torque, and bar 806 represents an amount of air conditioner compressor torque applied to the energy conversion device.

It can be understood from FIG. 8A that all torque demands on the energy conversion device exceed the torque output capacity of the energy conversion device. Therefore, less torque than is desired is available to one or more of the torque consumers of the energy conversion device. As a result, the vehicle operator may notice that less torque is available to the vehicle driveline to propel the vehicle. Consequently, the vehicle operator may be disappointed with the vehicle's performance.

Referring now to FIG. 8B, a bar graph that illustrates a condition where the air conditioner clutch is disengaged so that powertrain torque requirements may be met when air conditioner compressor torque and powertrain torque requirements exceed the amount of available energy conversion device brake torque is shown. In particular, bar 802 represents an amount of energy conversion device brake torque that is available. Bar 804 represents an amount of powertrain requested torque. No bar is provided for air conditioner compressor torque since the air conditioner torque is decoupled from the energy conversion device. Although the desired powertrain torque requirements are satisfied, the operator may experience discomfort or dissatisfaction that the air conditioning system cooling capacity is deactivated.

Referring now to FIG. 8C, a bar graph that illustrates the method of FIG. 10 is shown. Specifically, the amount of torque consumed by the air conditioning system is reduced or adjusted such that the powertrain requested torque and the air conditioner compressor torque may be provided by the energy conversion device.

Bar 802 represents the amount of available energy conversion device brake torque available. Bar 804 represents an amount of powertrain requested torque, and bar 806 represents an amount of air conditioner compressor torque applied to the energy conversion device.

It can be observed that the air conditioner torque is reduced as compared to in FIG. 8A so that the sum of powertrain requested torque and air conditioner torque match the amount of torque available from the energy conversion device without reducing the amount of powertrain torque. In this way, the driver demand torque may be provided to accelerate the vehicle while cooling capacity remains with the air conditioning system. Alternatively, the air conditioner torque can be adjusted so that a proportion of air conditioner torque is reduced so that powertrain torque and air conditioner torque are reduced at a desirable level.

Referring now to FIG. 9, a method for controlling an air conditioning system is shown. The method of FIG. 9 may be provided via instructions executed by controller 12 of FIGS. 1 and 2 in the system as described in FIGS. 1 and 2.

At 902, method 900 determines operating conditions. Operating conditions may include air conditioning system operating conditions, energy conversion device operating conditions, and vehicle operating conditions. Operating conditions include but are not limited to evaporator temperature, solar load, cabin humidity, cabin temperature, engine speed, engine load, motor current, and motor speed. Method 900 proceeds to 904 after operating conditions are determined.

At 904, method 900 selects air conditioner compressor clutch state. In one example, method 900 selects air conditioner compressor clutch state as described at 340-344 of FIG. 3. In particular, method 900 receives operator and air conditioning system inputs. The inputs are processed via logic and desired air conditioner compressor clutch state is selected. Method 900 proceeds to 906 after desired air conditioner compressor clutch state is selected.

At 906, method 900 determines desired evaporator temperature as described at 302 of FIG. 3. In one example, the desired evaporator temperature is continuously supplied to the controller that operates the energy conversion device and the air conditioner compressor. If the air conditioning system is deactivated, the desired evaporator temperature may be set to ambient temperature. If the air conditioning system is active, the desired evaporator temperature may be allowed to vary about an air conditioner evaporator control temperature as illustrated in FIG. 4. Method 900 proceeds to 908 after desired evaporator temperature is determined.

At 908, method 900 determined a feed forward air conditioner compressor displacement command. The feed forward air conditioner compressor displacement command may be determined as described at 350 of FIG. 3. For example, the desired evaporator temperature may index a function or table that outputs a variable value of a duty cycle, command voltage, command current, scaler, that provides the desired evaporator temperature during nominal operating conditions when the variable is output to the air conditioner compressor displacement actuator (e.g., control valve 20 of FIG. 1). Method 900 proceeds to 910 after the feed forward air conditioner compressor displacement command is determined.

At 910, method 900 determines expected evaporator temperature. In one example, expected evaporator temperature is determined as described with regard to 304 of FIG. 3 and FIG. 4. Specifically, a delay and filter time constant are applied to the desired evaporator temperature. In other examples, a delay and a predetermined rate limit of temperature rise or a predetermined rate limit of temperature decay may be applied to the desired evaporator temperature. Method 900 proceeds to 912 after the expected evaporator temperature is determined.

At 912, method 900 determines an evaporator temperature error. The evaporator temperature error may be determined by subtracting the actual evaporator temperature from the expected evaporator temperature from 910. Method 900 proceeds to 914 after the evaporator temperature error is determined.

At 914, method 900 judges whether or not the evaporator temperature threshold is greater than a predetermined threshold. If so, method 900 proceeds to 918. Otherwise, method 900 proceeds to 916.

At 918, method determined air conditioner compressor displacement command adjustments (e.g., adjustments to air conditioner piston stroke) from proportional, integral, and derivative (PID) terms. In one example, the air conditioner compressor command adjustments from PID terms are determined as described at 312-316, 320, and 324. In particular, the evaporator error is modified via proportional, integral, and derivative terms. The integral term is limited to a predetermined level so that the controller doesn't continue to adjust due to a value in the integral term when the evaporator temperature error is near zero. The PID air conditioner compressor displacement command adjustments are added together and method 900 proceeds to 920.

At 916, method 900 determines air conditioner compressor displacement adjustments via a high gain memory less operation. In one example, method 900 determines air conditioner compressor adjustments according to 318-322 of FIG. 3. For example, the evaporator temperature error may be multiplied by a parabolic function that increases the air conditioner compressor displacement adjustment exponentially as the evaporator temperature error increases. Method 900 proceeds to 920.

At 920, method 900 determines the air conditioner compressor displacement command by summing the PID, high gain memory less, and feed forward air conditioner compressor displacement commands. Method 900 proceeds to 922 after the adjusted air conditioner compressor displacement command is determined.

At 922, method 900 provides soft start and stop start for the air conditioner compressor when the air conditioner compressor is stopped or started. In one example, method 900 provides soft start and soft start to the air conditioner compressor as described at 328 of FIG. 3, FIGS. 5-6, and FIG. 11. The soft start/stop allows a smooth torque transition when the air conditioner compressor clutch is activated and deactivated. Method 900 proceeds to 924 after air conditioner clutch commands and air conditioner compressor displacement signals are adjusted to provide soft air conditioner compressor stopping and starting.

At 924, method 900 provides for limiting and/or adjusting air conditioner compressor displacement command to soft start and stop start for the air conditioner compressor when the air conditioner compressor is stopped or started. In one example, method 900 provides soft start and soft start to the air conditioner compressor as described at 328 of FIG. 3, FIGS. 5-6, and FIG. 11. The soft start/stop allows a smooth torque transition when the air conditioner compressor clutch is activated and deactivated. Method 900 proceeds to 924 after air conditioner clutch commands and air conditioner compressor displacement signals are adjusted to provide soft air conditioner compressor stopping and starting.

At 924, method 900 limits and/or adjusts the air conditioner compressor displacement command to control air conditioner compressor torque to a desirable level given energy conversion device available brake torque and powertrain torque requirements. In one example, the air conditioner compressor displacement command is adjusted and/or limited as described at 330 of FIG. 3, FIG. 8C, and FIG. 10. Specifically, the air conditioner compressor displacement command can be adjusted so that the powertrain torque requirements are met. If the powertrain torque requirements cannot be met via reducing the air conditioner compressor displacement command, the air conditioner clutch may be opened to uncouple the air conditioner compressor from the energy conversion device. The air conditioner clutch may be deactivated after the air conditioner displacement command is set to a minimum level. Method 900 proceeds to 926 after the air conditioner compressor displacement command is adjusted based on powertrain torque requirements and energy conversion device available brake torque.

At 926, method 900 outputs the air conditioner compressor displacement command and the air conditioner compressor clutch command. The commands may be output via a duty cycle, controller area network (CAN), data bus, analog channel, or other known output type. Method 900 proceeds to 928 after the air conditioner commands are output.

At 928, method 900 adjusts torque output from the energy conversion device to compensate for changes in the powertrain torque requirements torque and the air conditioner compressor torque. In one example, where the energy conversion device is an engine, engine output can be increased via opening an engine throttle further and increasing an amount of fuel injected to the engine. Engine spark timing may also be adjusted to adjust engine torque. Conversely, if the powertrain torque requirements and/or the air conditioner compressor torque requirements are reduced, the engine torque can be decreased via closing the engine throttle and reducing the amount of fuel injected. The engine torque demand can be adjusted according to the sum of the powertrain torque requirements and the air conditioner compressor torque up to the WOT engine torque limit.

In another example where the energy conversion device is an electric motor, the motor torque can be adjusted via adjusting current applied to a field of the motor. For example, if additional motor torque is requested field current may be increased. On the other hand, field current can be decreased to decrease motor output torque.

Thus, the method of FIG. 9 incorporates the controller as described in FIG. 3 to adjust the air conditioner clutch and air conditioner compressor of FIGS. 1 and 2. Further, the method of FIG. 9 coordinates clutch commands and air conditioner compressor displacement commands as illustrated in FIGS. 5 and 6.

Referring now to FIG. 10, a method for limiting and/or adjusting an air conditioner displacement demand is shown. The method of FIG. 10 may be provided via instructions executed by controller 12 of FIGS. 1 and 2 in the system as described in FIGS. 1 and 2.

At 1002, method 900 determines available energy conversion device brake torque. In one example where the energy conversion device is an engine, available engine brake torque may be determined empirically by operating the engine at selected engine speeds at wide open throttle (WOT) or full load. WOT engine brake torque for the selected engine speeds may be held in a table or function that is stored in memory. The table or function may be indexed using the present engine speed and the table or function outputs the WOT engine brake torque which is interpreted as the available engine brake torque.

If the energy conversion device is a motor, the available motor torque may be empirically determined and stored in a table or function based on the present motor speed and field strength or current available (e.g., maximum field current) at the present motor speed. The available brake torque may be determined via indexing the table or function using the present motor speed. Method 1000 proceeds to 1004 after the energy conversion device brake torque is determined.

At 1004, method 1000 determined powertrain torque requirements. Powertrain torque requirements may include operator requested driveline torque and engine accessory torque other than air conditioner torque. The operator requested driveline torque may be determined via reading a sensor coupled to an accelerator pedal or via another type of operator input. In some examples, the requested driveline torque may be provided by a hybrid controller or another controller. Torque of engine accessories may be determined via models of the accessories or from empirically determined look-up tables that are indexed according to operating conditions. For example, a power steering load may be determined based on steering wheel angle, vehicle speed, and energy conversion device speed. Alternator load may be determined based on alternator field current and alternator speed. The powertrain torque requirement is the sum of the operator requested driveline torque and engine accessory torque. Method 1000 proceeds to 1006 after powertrain torque is determined.

At 1006, method 1000 determines an available amount of air conditioner compressor torque. In one example, available air conditioner compressor torque may be determined by subtracting the powertrain torque requirements from the available energy conversion device brake torque. The remainder of torque may be made available to the air conditioner compressor. For example, if the available energy conversion device brake torque is 400 N-M and the powertrain torque requirements are 380 N-M, then 20 N-M of torque is available to the air conditioner compressor.

The air conditioner compressor torque may be estimated via a model that sums air conditioner compressor friction torque, air conditioner compressor inertia torque, air conditioner pumping torque (e.g., a compressor torque based on air conditioner compressor head pressure, air conditioner compressor clutch speed and air conditioner compressor displacement), and air conditioner dynamic pumping torque (e.g., a change in air conditioner head pressure). The model may also be inverted to determine the adjustment to torque output of the energy conversion device.

In other examples, more sophisticated ways to determine available air conditioner torque may be provided. For example, powertrain torque requirements may be added to the amount torque to operate an air conditioner compressor at a desired cooling capacity to determine a consumer torque (e.g., an amount of energy conversion device torque demanded via the operator, air conditioner, power steering, alternator, etc.). The consumer torque is then subtracted from the energy conversion brake torque. If the remainder is positive, the air conditioner compressor may be operated at the desired cooling capacity (e.g., the air conditioner compressor may be operated with a stroke where air conditioner compressor output pressure capacity meets the desired cooling capacity). The amount of air conditioner compressor torque to operate at a desired cooling capacity may be empirically determined and stored in memory for subsequent retrieval. On the other hand, if the remainder is negative, the remainder may be multiplied by a constant or function to determine an amount of torque reduction in the air conditioner compressor torque applied to the energy conversion device. Thus, the air conditioner torque may be reduced to exchange air conditioning cooling capacity for driveline torque or torque for accessories other than the air conditioner.

In one example, where the available energy conversion device brake torque is 390 N-M, powertrain torque requirements torque is 370 N-M, and torque to operate the air conditioner at full capacity is 40 N-M, the energy conversion device brake torque capacity is 20 N-M less than the consumer torque (390 N-M−(370 N-M+40 N-M)=−20 N-M). Therefore, at least 20 N-M of torque has to be removed from the air conditioner torque and/or the powertrain torque requirement in order to keep consumer torque below available energy conversion device torque. However in some examples, an additional amount of torque may be removed. For example, 105% of the difference between the available energy conversion device brake torque and consumer torque may be removed from the air conditioner and/or powertrain requirements torque to provide an excess torque buffer. In this example, the air conditioner compressor torque may be reduced by 10 N-M so that powertrain torque can be reduced by 10 N-M. Thus, the energy conversion device torque requested by the air conditioner compressor and the powertrain torque requirements is less than or equal to the available energy conversion device brake torque. In this way, the air conditioner requested torque is reduced by an amount that accounts for 50% of the amount of torque requested that exceeds the available energy conversion device brake torque to provide the available air conditioner compressor torque of 30 N-M. The powertrain requested torque is reduced by an amount that accounts for 50% of the amount of torque requested that exceeds the available energy conversion device brake torque, but the torque reduction is only 3% of powertrain requirements torque. Of course, other percentages of torque reduction may be provide via changing functions or constants that allocate torque between the powertrain requested torque and the air conditioner torque.

In other examples, where the air conditioner compressor requested torque is less than is used for full air conditioner compressor cooling capacity at a time when the powertrain torque and the air conditioning torque exceeds the available energy conversion device torque, the air conditioner compressor cooling capacity at the present time may be reduced according to a constant or function. For example, where the available energy conversion device brake torque is 390 N-M, powertrain torque requirements torque is 380 N-M, and torque to operate the air conditioner at 80% of full capacity is 35 N-M, the energy conversion device brake torque capacity is 25 N-M less than the consumer torque (390 N-M−(380 N-M+35 N-M)=25 N-M). Therefore, 25 N-M of torque has to be removed from the air conditioner torque and/or powertrain torque requirement. The air conditioner compressor torque may be reduced by 15 N-M so that powertrain torque is reduced by only 10 N-M to reduce the requested consumer torque to 390 N-M. Thus, the air conditioner requested torque is reduced by an amount that accounts for 60% of the amount of consumer torque requested that exceeds the available energy conversion device brake torque to provide available air conditioner compressor torque of 20 N-M. The powertrain requested torque is reduced by an amount that accounts for 40% of the amount of consumer torque requested that exceeds the available energy conversion device brake torque, or just about 3% of the powertrain torque requirements. In this example, the air conditioner compressor cooling capacity at the present time is reduced according to a constant or function calling for 60% reduction in air conditioner compressor torque.

The constant or function that adjusts the requested air conditioner compressor torque to provide the available air conditioner compressor torque may be indexed based on the rate of change of the desired operator requested driveline torque. For example, if the desired operator requested driveline torque changes at more than a predetermined rate, 80% or more of the reduction in consumed torque may be a reduction in available air conditioner compressor torque. However, of the desired operator requested driveline torque changes at less than the predetermined rate, less than 80% of the reduction in consumed torque may be a reduction in available air conditioner compressor torque. Thus, if the rate of change in desired operator requested driveline torque is less than a first amount, the amount of reduction in the available air conditioner compressor torque is reduced by a first amount. If the rate of change in desired operator requested driveline torque is greater than the first amount, the amount of reduction in the available air conditioner compressor torque is reduced to a second amount, the second amount greater than the first amount. In this way, the reduction in available air conditioner compressor torque may be based on the rate of change in the desired operator requested driveline torque. Method 1000 proceeds to 1008 after the available air conditioner compressor torque is determined.

At 1008, method 1000 limits the air conditioner displacement command. In one example, the air conditioner displacement command is limited to the available air conditioner compressor torque. For example, if the available air conditioner compressor torque is 20 N-M, the air conditioner displacement command is limited to a value that provides 20 N-M or less of a load on the energy conversion device via the air conditioner compressor. Thus, the combined available air conditioner compressor torque and the requested powertrain requirements torque is less than or equal to the available energy conversion brake torque. In this way, the available air conditioner compressor torque can be reduced or increased as requested powertrain torque varies. Method 1000 proceeds to exit after the air conditioner displacement command is limited.

Referring now to FIG. 11, a method for providing soft starting and stopping of a vehicle air conditioner compressor is shown. The method of FIG. 11 may be provided via instructions executed by controller 12 of FIGS. 1 and 2 in the system as described in FIGS. 1 and 2. Method 1100 may provide the example sequences shown in FIGS. 5 and 6.

At 1102, method 1100 judges whether or not there is a request for air conditioner compressor state change. A request for air conditioner compressor clutch state change may be made in response in to an operator's request to activate or deactivate an air conditioning system. For example, an air conditioner clutch state may be changed from an open state to a closed state when additional vehicle cabin cooling is requested. Further, a request for a change in air conditioner clutch state may be initiated in response to an increase or decrease in vehicle cabin temperature. If method 1100 judges a request to change state of the air conditioner compressor clutch, method 1100 proceeds to 1104. Otherwise, method 1100 proceeds to exit.

At 1104, method 1100 judges whether or not the request to change air conditioner compressor clutch state is a request to close the air conditioner compressor clutch. If so, method 1100 proceeds to 1106. Otherwise, method 1100 proceeds to 1112. Thus, method 1100 provides two different sequences for closing (e.g., starting the air conditioning system) and opening (e.g., stopping the air conditioning system) the air conditioner compressor clutch.

At 1106, method 1100 closes the air conditioner compressor clutch. In one example, the air conditioner clutch may be closed via directing a current or voltage to the air conditioner clutch so that the air conditioner clutch is electromechanically closed. In other examples, the air conditioner clutch may be hydraulically closed. The air conditioner compressor displacement command is also reduced to a low level (e.g., minimum level) before 1106 if it is not initially at a low level. Method 1100 proceeds to 1108 after the air condition compressor clutch is closed.

At 1108, method 1100 delays a predetermined amount of time before making further air conditioner compressor adjustments. For example, the delay may be a constant or variable depending on operating conditions as described with regard to FIG. 5. Method 1100 proceeds to 1110 after the delay time has expired.

At 1110, method 1100 ramps up the air conditioner compressor displacement command. The air conditioner compressor displacement command increases the air conditioner compressor's capacity of pressurize refrigerant and cool the evaporator when it is ramped up. In one example, ramping up the air conditioner compressor displacement command increases the stroke of the air conditioner compressor piston. The ramping of air conditioner compressor displacement may be at a constant rate as shown in FIG. 5 or dependent on a predetermined function (e.g., a parabolic ramp rate). The air conditioner compressor displacement command completes the ramp when the air conditioner compressor displacement command reaches a level equivalent to the sum of the feed forward gain, the PID output, and the high gain as described with regard to FIGS. 3 and 920 of FIG. 9. Method 1100 proceeds to exit after the air conditioner compressor displacement command is finished ramping.

At 1112, method 1100 ramps down the air conditioner compressor displacement command. The air conditioner compressor displacement command decreases the air conditioner compressor's capacity of pressurize refrigerant and cool the evaporator when it is ramped down. In one example, ramping down the air conditioner compressor displacement command decreases the stroke of the air conditioner compressor piston. The ramping of air conditioner compressor displacement may be at a constant rate as shown in FIG. 6 or dependent on a predetermined function (e.g., a parabolic ramp rate). The air conditioner compressor displacement command completes the ramp when the air conditioner compressor displacement command reaches a low or minimum level. Method 1100 proceeds to 1114 after the air conditioner compressor displacement command is finished ramping down.

At 1114, method 1100 delays a predetermined amount of time before opening the air conditioner compressor clutch. For example, the delay may be a constant or variable depending on operating conditions as described with regard to FIG. 6. Method 1100 proceeds to 1116 after the delay time has expired.

At 1116, method 1100 opens the air conditioner compressor clutch. In one example, the air conditioner clutch may be opened via stopping current or voltage supplied to the air conditioner clutch so that the air conditioner clutch is electromechanically opened. In other examples, the air conditioner clutch may be hydraulically opened. Method 1100 proceeds to exit after the air conditioner compressor clutch is opened.

In this way, a torque load of an air conditioner compressor is reduced before the air conditioner compressor is coupled or decoupled from an energy conversion device. Further, the progression of applying or removing torque to the energy conversion device from the air conditioning compressor is adjusted to account for operating conditions of the energy conversion device so as to reduce the possibility of disturbing the vehicle driver. Further still, operation of the energy conversion device is allowed to stabilize at a condition where air conditioning compressor load is low before the compressor is decoupled from the energy conversion device or before additional torque is applied to the energy conversion device via the air conditioner compressor.

As will be appreciated by one of ordinary skill in the art, routines described in FIGS. 3 and 9-11 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A system for controlling an air conditioner of a vehicle, comprising:
an air conditioner compressor including a piston and a variable displacement control valve for adjusting a stroke of the piston;
a clutch mechanically coupled to the air conditioner compressor;

an electric motor supplying rotational energy to the air conditioner compressor; and a controller including instructions, executed by the controller, for adjusting the stroke of the piston in response to an evaporator temperature error, the evaporator temperature error being a difference between an expected evaporator temperature and a measured or inferred evaporator temperature, the expected evaporator temperature determined from a desired evaporator temperature received at the controller, and for determining air conditioner compressor torque applied to the electric motor and a torque adjustment to the electric motor in response to the torque of the air conditioner compressor, wherein the stroke adjustment is limited based on available air conditioner compressor torque, wherein the expected evaporator temperature is determined according to an engagement state of an air conditioner compressor clutch and filtering of the desired evaporator temperature.

2. The system of claim 1, wherein the controller further includes instructions for determining available air conditioner compressor torque by subtracting powertrain torque requirements from available electric motor brake torque.

3. The system of claim 2, wherein the controller further includes instructions for estimating an air conditioner compressor torque by summing two or more of conditioner compressor friction torque, air conditioner compressor inertia torque, air conditioner pumping torque, and air conditioner dynamic pumping torque.

4. The system of claim 1, wherein the adjusting the stroke includes, responsive to air conditioner compressor requested torque being less than full air conditioner compressor cooling capacity at a time when powertrain torque and air conditioning torque exceeds available electric motor torque, reducing the air conditioner compressor cooling capacity at the present time according to a function that is based on a rate of change of desired operator requested driveline torque.

5. The system of claim 1, wherein the controller further includes instructions for determining available air conditioner compressor torque based on a rate of change in desired operator requested driveline torque.

6. The system of claim 5, wherein the controller further includes instruction to determine if the rate of change in desired operator requested driveline torque is less than a first amount, and responsive thereto reduce an amount of reduction in the available air conditioner compressor torque by a first amount, and further to determine if the rate of change in desired operator requested driveline torque is greater than the first amount, reduce the amount of reduction in the available air conditioner compressor torque to a second amount, the second amount greater than the first amount.

7. The system of claim 1, where the expected evaporator temperature is based on an expected rate of drop in an evaporator temperature when the air conditioner compressor clutch is closed.

8. The system of claim 1, where the expected evaporator temperature is based on an expected rate of rise in an evaporator temperature when the air conditioner compressor clutch is opened.

* * * * *